(12) United States Patent
Jang et al.

(10) Patent No.: US 10,856,144 B2
(45) Date of Patent: Dec. 1, 2020

(54) METHOD, SERVER, AND TERMINAL FOR TRANSMITTING AND RECEIVING DATA

(71) Applicant: Samsung Electronics Co., Ltd., Gyeonggi-do (KR)

(72) Inventors: Jong-hyuk Jang, Gyeonggi-do (KR); Mun-hwan Choi, Seoul (KR); Dae-hyung Kwon, Seoul (KR); Yong-tae Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/579,704

(22) PCT Filed: Jun. 3, 2016

(86) PCT No.: PCT/KR2016/005905
§ 371 (c)(1),
(2) Date: Dec. 5, 2017

(87) PCT Pub. No.: WO2016/195414
PCT Pub. Date: Dec. 8, 2016

(65) Prior Publication Data
US 2018/0176140 A1 Jun. 21, 2018

(30) Foreign Application Priority Data
Jun. 5, 2015 (KR) ........................ 10-2015-0080028

(51) Int. Cl.
*H04L 12/813* (2013.01)
*H04W 12/06* (2009.01)
(Continued)

(52) U.S. Cl.
CPC ............. *H04W 12/06* (2013.01); *H04L 47/20* (2013.01); *H04L 65/4038* (2013.01);
(Continued)

(58) Field of Classification Search
CPC . H04L 27/2692; H04L 47/20; H04L 65/4038; H04L 65/4061; H04W 76/45;
(Continued)

(56) References Cited

U.S. PATENT DOCUMENTS 6,590,865 B1 * 7/2003 Ibaraki ............. H04L 12/40058
370/230
7,024,203 B1 * 4/2006 Naghian ............... H04W 28/18
455/436
(Continued)

FOREIGN PATENT DOCUMENTS

CN 1866846 11/2006
CN 101238708 8/2008
(Continued)

OTHER PUBLICATIONS

European Search Report dated Apr. 13, 2018 issued in counterpart application No. 16803767.9-1214, 11 pages.
(Continued)

*Primary Examiner* — Ivan O Latorre
(74) *Attorney, Agent, or Firm* — The Farrell Law Firm, P.C.

(57) ABSTRACT

The present disclosure is related to technology for a sensor network, machine to machine (M2M) communication, machine type communication (MTC), and Internet of Things (IoT). Provided is a method, performed by a server, of transmitting and receiving data, in which, as a transmission authority request is received from at least one terminal from among a plurality of terminals connected to the server, a number of transmitting terminals previously determined by the server is compared with a maximum number of transmitting terminals allowable by the server, in response to the transmission authority request, and a transmission authority of the at least one terminal is determined based on a result of the comparing. The present disclosure are applicable to intelligent services based on the technology (e.g., smart home, smart building, smart city, smart car or connected car, health care, digital education, retail business, security, and safety-related service).

11 Claims, 18 Drawing Sheets

(51) Int. Cl.
*H04W 28/02* (2009.01)
*H04L 29/06* (2006.01)
*H04W 76/45* (2018.01)
*H04W 88/18* (2009.01)
*H04W 4/10* (2009.01)
*H04W 4/70* (2018.01)

(52) U.S. Cl.
CPC ......... *H04L 65/4061* (2013.01); *H04W 28/02* (2013.01); *H04W 28/0215* (2013.01); *H04W 76/45* (2018.02); *H04W 88/181* (2013.01); *H04W 4/10* (2013.01); *H04W 4/70* (2018.02)

(58) Field of Classification Search
CPC ............... H04W 28/02; H04W 88/181; H04W 28/0215; H04W 12/06; H04W 4/10; H04W 4/70
See application file for complete search history.

(56) References Cited

U.S. PATENT DOCUMENTS

| | | | |
|---|---|---|---|
| 7,668,149 B2 | 2/2010 | Zhao et al. |
| 7,668,515 B2 | 2/2010 | Maybluni et al. |
| 7,674,145 B2 | 3/2010 | Okuyarna et al. |
| 7,676,246 B2 | 3/2010 | Kreiter |
| 7,683,925 B2 | 3/2010 | Lee |
| 7,684,805 B2 | 3/2010 | Zhao et al. |
| 7,684,814 B2 | 3/2010 | Kim |
| 7,697,949 B2 | 4/2010 | Yoshida et al. |
| 7,702,348 B2 | 4/2010 | Xue |
| 7,708,372 B2 | 5/2010 | Silverbrook |
| 7,747,268 B2 | 6/2010 | Lim |
| 7,751,348 B2 | 7/2010 | Shaffer et al. |
| 7,764,971 B2 | 7/2010 | Chu et al. |
| 7,774,011 B2 | 8/2010 | Sung et al. |
| 7,792,499 B2 | 9/2010 | Chen et al. |
| RE41,946 E | 11/2010 | Anderson et al. |
| 7,839,815 B2 | 11/2010 | Feder et al. |
| 7,843,411 B2 | 11/2010 | Manning |
| 7,860,524 B2 | 12/2010 | Laible et al. |
| 7,886,052 B2 | 2/2011 | Koponen et al. |
| 7,886,063 B2 | 2/2011 | Huh et al. |
| 7,895,283 B1 | 2/2011 | Hazy |
| 7,925,287 B2 | 4/2011 | Park et al. |
| 7,929,713 B2 | 4/2011 | Victorian et al. |
| 7,931,537 B2 | 4/2011 | Filer et al. |
| 7,932,192 B2 | 4/2011 | Fujisawa et al. |
| 7,936,716 B2 | 5/2011 | Jang et al. |
| 7,953,054 B2 | 5/2011 | Gurin |
| 8,004,977 B2 | 8/2011 | Vitebsky et al. |
| 8,010,144 B2 | 8/2011 | Luft et al. |
| 8,014,824 B2 | 9/2011 | Alden |
| 8,073,433 B2 | 12/2011 | Baiestrieri |
| 8,094,799 B2 | 1/2012 | Bushnell et al. |
| 8,095,163 B2 | 1/2012 | Mechaley, Jr. |
| 8,098,610 B2 | 1/2012 | Oliveira et al. |
| 8,155,641 B2 | 4/2012 | Hirsch |
| 8,160,054 B2 | 4/2012 | Weiner |
| 8,163,663 B2 | 4/2012 | Lai et al. |
| 8,175,010 B2 | 5/2012 | Sung et al. |
| 8,175,641 B2 | 5/2012 | Bergeron et al. |
| 8,195,214 B2 | 6/2012 | Yoshida et al. |
| 8,200,268 B2 | 6/2012 | Benco et al. |
| 8,204,041 B2 | 6/2012 | Britsch |
| 8,224,366 B2 | 7/2012 | Reich et al. |
| 8,229,487 B2 | 7/2012 | Kaida |
| 8,238,931 B1 | 8/2012 | Sarkar et al. |
| 8,243,411 B2 | 8/2012 | Larson |
| 8,249,102 B2 | 8/2012 | Koren et al. |
| 8,275,307 B2 | 9/2012 | Doyle, III |
| 8,290,526 B2 | 10/2012 | Broadley et al. |
| 8,320,874 B2 | 11/2012 | Mills et al. |
| 8,346,225 B2 | 1/2013 | Raleigh |
| 8,351,969 B2 | 1/2013 | Park et al. |
| 8,355,720 B2 | 1/2013 | Harris |
| 8,364,153 B2 | 1/2013 | Boucher et al. |
| 8,396,002 B2 | 3/2013 | Marshall-Wlson |
| 8,406,684 B1 | 3/2013 | Yeh et al. |
| 8,412,253 B2 | 4/2013 | Holm et al. |
| 8,417,275 B2 | 4/2013 | Reich et al. |
| 8,442,506 B2 | 5/2013 | Peacock |
| 8,448,207 B2 | 5/2013 | Balestrieri |
| 8,456,985 B2 | 6/2013 | Hannosh et al. |
| 8,494,571 B1 | 7/2013 | Gailloux et al. |
| 8,532,585 B2 | 9/2013 | Deleus et al. |
| 8,538,458 B2 | 9/2013 | Haney |
| 8,558,706 B1 | 10/2013 | Yoder |
| 8,565,139 B2 | 10/2013 | Kale et al. |
| RE44,577 E | 11/2013 | Yafuso et al. |
| 8,583,158 B2 | 11/2013 | Lee et al. |
| 8,585,605 B2 | 11/2013 | Sola I Caros et al. |
| 8,588,210 B2 | 11/2013 | Newberg et al. |
| 8,588,436 B2 | 11/2013 | Shim |
| 8,588,437 B2 | 11/2013 | Shim |
| 8,599,724 B2 | 12/2013 | Packer et al. |
| 8,625,453 B2 | 1/2014 | Holm |
| 8,638,662 B2 | 1/2014 | Vitebsky et al. |
| 8,645,477 B2 | 2/2014 | Katis et al. |
| 8,654,686 B2 | 2/2014 | Anchan |
| 8,654,690 B2 | 2/2014 | Song |
| 8,670,759 B2 | 3/2014 | Shinada |
| 8,676,243 B2 | 3/2014 | Blanco |
| 8,676,244 B2 | 3/2014 | Blanco |
| 8,681,751 B2 | 3/2014 | Kiss |
| RE44,861 E | 4/2014 | Park et al. |
| 8,688,789 B2 | 4/2014 | Katis et al. |
| 8,699,369 B2 | 4/2014 | Roy et al. |
| 8,699,708 B2 | 4/2014 | Hampel et al. |
| 8,700,080 B2 | 4/2014 | Crockett et al. |
| 8,705,377 B2 | 4/2014 | Fraser |
| 8,705,515 B2 | 4/2014 | Lindner |
| 8,750,206 B2 | 6/2014 | Feder et al. |
| 8,761,823 B2 | 6/2014 | Shuman et al. |
| 8,775,163 B1 | 7/2014 | Bristol et al. |
| 8,780,163 B2 | 7/2014 | Cahill et al. |
| 8,798,593 B2 | 8/2014 | Haney |
| 8,825,027 B2 | 9/2014 | Sung et al. |
| 8,830,898 B2 | 9/2014 | Bauwers |
| 8,849,927 B2 | 9/2014 | Katis et al. |
| 8,856,003 B2 | 10/2014 | Chong et al. |
| 8,888,217 B2 | 11/2014 | Nishikawa et al. |
| 8,903,445 B2 | 12/2014 | Dahl et al. |
| 8,923,833 B2 | 12/2014 | Karnachl et al. |
| 9,338,803 B2 | 5/2016 | Shimizu |
| 9,510,359 B2 | 11/2016 | Laroia et al. |
| 2002/0093956 A1 | 7/2002 | Gurin |
| 2002/0107053 A1 | 8/2002 | Petez et al. |
| 2002/0142797 A1 | 10/2002 | Tarighi et al. |
| 2002/0158812 A1 | 10/2002 | Pallakoff |
| 2002/0172165 A1 | 11/2002 | Rosen et al. |
| 2002/0183118 A1 | 12/2002 | Wolinsky |
| 2003/0059078 A1 | 3/2003 | Downs et al. |
| 2003/0105409 A1 | 6/2003 | Donoghue et al. |
| 2004/0077358 A1 | 4/2004 | Bennett et al. |
| 2004/0177224 A1 | 9/2004 | Devaney et al. |
| 2004/0203627 A1 | 10/2004 | Loomis |
| 2005/0002345 A1 | 1/2005 | Pyo et al. |
| 2005/0058313 A1 | 3/2005 | Victorian et al. |
| 2005/0080520 A1 | 4/2005 | Kline et al. |
| 2005/0100965 A1 | 5/2005 | Ghayur et al. |
| 2005/0124365 A1 | 6/2005 | Balasuriya et al. |
| 2005/0125843 A1 | 6/2005 | Okezie et al. |
| 2005/0136952 A1 | 6/2005 | Zabawskyj et al. |
| 2005/0137878 A1 | 6/2005 | Roth et al. |
| 2005/0149741 A1 | 7/2005 | Humbel |
| 2005/0157668 A1 | 7/2005 | Sivan |
| 2005/0233140 A1 | 10/2005 | Oh et al. |
| 2005/0249153 A1 | 11/2005 | Park et al. |
| 2005/0265350 A1 | 12/2005 | Narasimha et al. |
| 2006/0031560 A1 | 2/2006 | Warshaysky et al. |
| 2006/0035555 A1 | 2/2006 | Narayanan et al. |
| 2006/0047820 A1 | 3/2006 | Sung et al. |
| 2006/0050683 A1 | 3/2006 | Wall et al. |

(56) References Cited

U.S. PATENT DOCUMENTS

| | | |
|---|---|---|
| 2006/0114854 A1 | 6/2006 | Wotherspoon et al. |
| 2006/0121925 A1 | 6/2006 | Jung |
| 2006/0126560 A1 | 6/2006 | Wotherspoon et al. |
| 2006/0154681 A1* | 7/2006 | Park .................. H04W 4/10 455/518 |
| 2006/0165224 A1 | 7/2006 | Lee |
| 2006/0172755 A1 | 8/2006 | Park |
| 2006/0178161 A1* | 8/2006 | Jung .................. H04W 8/20 455/518 |
| 2006/0211450 A1* | 9/2006 | Niekerk ............... H04W 84/08 455/558 |
| 2006/0265451 A1* | 11/2006 | Tomimori ........... H04L 63/104 709/204 |
| 2006/0284763 A1 | 12/2006 | Riley |
| 2007/0002779 A1 | 1/2007 | Lee et al. |
| 2007/0004438 A1 | 1/2007 | Brusliovsky et al. |
| 2007/0075914 A1 | 4/2007 | Bates |
| 2007/0087768 A1* | 4/2007 | Schmidt ................ H04W 4/10 455/518 |
| 2007/0105578 A1 | 5/2007 | Shaffer et al. |
| 2007/0133435 A1* | 6/2007 | Eneroth ................ H04W 4/10 370/260 |
| 2007/0135691 A1 | 6/2007 | Zingelewicz et al. |
| 2007/0206760 A1 | 9/2007 | Bandhole et al. |
| 2007/0208732 A1 | 9/2007 | Flowers et al. |
| 2007/0249381 A1 | 10/2007 | Forslow |
| 2007/0268327 A9 | 11/2007 | Sliverbrook |
| 2007/0280154 A1 | 12/2007 | Gupta et al. |
| 2007/0281723 A1* | 12/2007 | Chotai .................. H04W 76/45 455/518 |
| 2007/0296765 A9 | 12/2007 | Silverbrook |
| 2008/0002668 A1 | 1/2008 | Asokan et al. |
| 2008/0026703 A1 | 1/2008 | Chakraborty et al. |
| 2008/0064430 A1 | 3/2008 | Kraft et al. |
| 2008/0192652 A1 | 8/2008 | Rossler et al. |
| 2008/0227427 A1 | 9/2008 | Kadavallur et al. |
| 2008/0227704 A1 | 9/2008 | Kamens |
| 2008/0248792 A1 | 10/2008 | Gundu |
| 2008/0258356 A1 | 10/2008 | Van Hove et al. |
| 2009/0033149 A1 | 2/2009 | Patel |
| 2009/0054092 A1 | 2/2009 | Stonefield et al. |
| 2009/0099459 A1 | 4/2009 | Svanberg et al. |
| 2009/0100570 A1 | 4/2009 | Tuan |
| 2009/0131092 A1* | 5/2009 | Kaida .................... H04W 4/08 455/518 |
| 2009/0149188 A1 | 6/2009 | McBeath et al. |
| 2009/0157799 A1 | 6/2009 | Sukumaran et al. |
| 2009/0216834 A1 | 8/2009 | Anderson et al. |
| 2009/0270110 A1 | 10/2009 | Ardalan |
| 2009/0296904 A1 | 12/2009 | Brewer et al. |
| 2009/0303909 A1 | 12/2009 | Farhoudi et al. |
| 2010/0014652 A1 | 1/2010 | Yasuda |
| 2010/0151911 A1 | 6/2010 | Mazzeo et al. |
| 2010/0159773 A1 | 6/2010 | Lai et al. |
| 2010/0227089 A1 | 9/2010 | Van Hove et al. |
| 2011/0044980 A1 | 2/2011 | Ghayur et al. |
| 2011/0045991 A1 | 2/2011 | Gite et al. |
| 2011/0053554 A1 | 3/2011 | Wong et al. |
| 2011/0077971 A1 | 3/2011 | Surwit et al. |
| 2011/0149845 A1 | 6/2011 | Song et al. |
| 2011/0159235 A1 | 6/2011 | Wang et al. |
| 2011/0165063 A1 | 7/2011 | Hsieh et al. |
| 2011/0171000 A1 | 7/2011 | Hailston |
| 2011/0217237 A1 | 9/2011 | Chen et al. |
| 2011/0250130 A1 | 10/2011 | Benatuil et al. |
| 2012/0027727 A1 | 2/2012 | Hall et al. |
| 2012/0046792 A1 | 2/2012 | Secor |
| 2012/0084401 A1* | 4/2012 | Handa ................ H04L 12/6418 709/219 |
| 2012/0170501 A1 | 7/2012 | Drozt et al. |
| 2012/0212339 A1 | 8/2012 | Goldblatt |
| 2012/0272281 A1* | 10/2012 | Ha .................. H04N 21/23439 725/110 |
| 2012/0275996 A1 | 11/2012 | Hsieh |
| 2013/0083733 A1 | 4/2013 | Park |
| 2013/0176401 A1 | 7/2013 | Monari et al. |
| 2013/0184595 A1 | 7/2013 | Mukkamala et al. |
| 2013/0219525 A1 | 8/2013 | Soffer |
| 2013/0237272 A1 | 9/2013 | Prasad |
| 2013/0250816 A1 | 9/2013 | Peacock |
| 2013/0274283 A1 | 10/2013 | Gatti et al. |
| 2013/0281034 A1 | 10/2013 | Mazzeo et al. |
| 2013/0331093 A1* | 12/2013 | Cho .................. H04B 7/14 455/426.1 |
| 2013/0335510 A1 | 12/2013 | Ordas Arnal et al. |
| 2014/0064083 A1* | 3/2014 | Ray .................. H04W 36/22 370/235 |
| 2014/0066118 A1 | 3/2014 | Pai |
| 2014/0081641 A1 | 3/2014 | Longe et al. |
| 2014/0093521 A1 | 4/2014 | Benatuil et al. |
| 2014/0119119 A1 | 5/2014 | Lee |
| 2014/0122600 A1 | 5/2014 | Kim et al. |
| 2014/0128032 A1 | 5/2014 | Muthukumar |
| 2014/0186377 A1 | 7/2014 | Gu et al. |
| 2014/0226468 A1 | 8/2014 | Feder et al. |
| 2014/0241253 A1 | 8/2014 | Pison et al. |
| 2014/0275324 A1 | 9/2014 | Morizur et al. |
| 2014/0349588 A1 | 11/2014 | Corretjer et al. |
| 2014/0349626 A1 | 11/2014 | Bishop, Jr. et al. |
| 2014/0355508 A1 | 12/2014 | Anchan et al. |
| 2015/0009865 A1 | 1/2015 | Sharma et al. |
| 2015/0257177 A1* | 9/2015 | Shimizu ............ H04M 1/72519 455/518 |
| 2015/0359013 A1* | 12/2015 | Krizik ..................... H04W 4/08 370/341 |
| 2016/0113036 A1* | 4/2016 | Stephens ................ H04W 72/02 370/312 |
| 2016/0345142 A1* | 11/2016 | Kashiwase ............... H04L 67/16 |
| 2017/0048894 A1* | 2/2017 | Choi ...................... H04W 4/10 |
| 2017/0257876 A1* | 9/2017 | Loehr .................... H04L 5/0044 |
| 2017/0272517 A1 | 9/2017 | Park et al. |
| 2017/0289776 A1* | 10/2017 | Kim ........................ H04W 4/08 |
| 2018/0132072 A1* | 5/2018 | Hyun ..................... H04W 4/10 |

FOREIGN PATENT DOCUMENTS

| | | |
|---|---|---|
| CN | 101335641 | 12/2008 |
| EP | 1 580 999 | 9/2005 |
| JP | 2013-243691 | 12/2013 |
| KR | 10-0400854 | 9/2003 |
| KR | 1020040093530 | 11/2004 |
| KR | 1020060065391 | 6/2006 |
| KR | 1020070047640 | 5/2007 |
| KR | 10-0948799 | 3/2010 |
| KR | 1020110050307 | 5/2011 |
| KR | 10-1248675 | 3/2013 |
| KR | 10-1301848 | 8/2013 |
| WO | WO 2014/002430 | 1/2014 |

OTHER PUBLICATIONS

Korean Office Action dated Apr. 18, 2018 issued in counterpart application No. 10-2015-0080028, 11 pages.
International Search Report dated Sep. 2, 2016 issued in counterpart application No. PCT/KR2016/005905, 27 pages.
Chinese Office Action dated Aug. 17, 2020 issued in counterpart application No. 201680044782.6, 20 pages.
Indian Examination Report dated Oct. 22, 2020 issued in counterpart application No. 201737046463, 4 pages.

* cited by examiner

FIG. 15
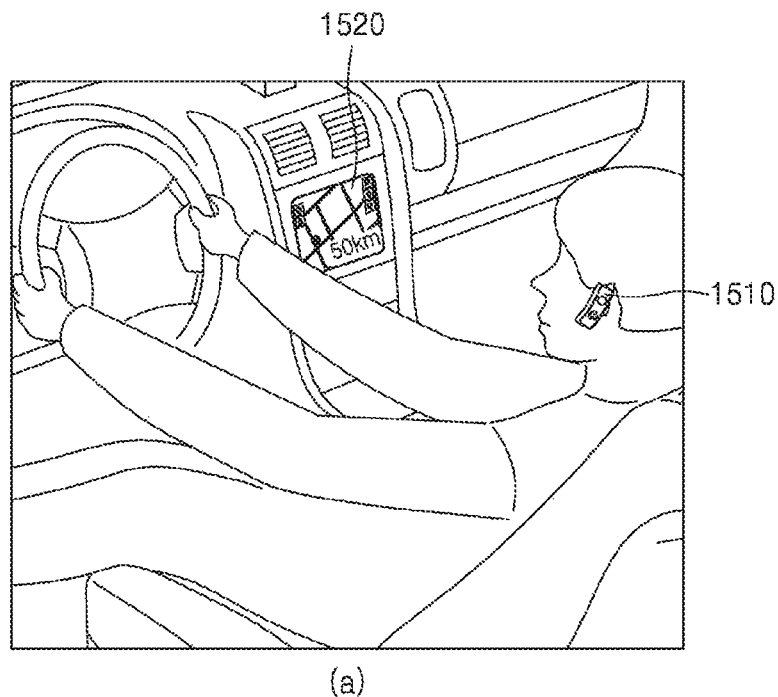
(a)
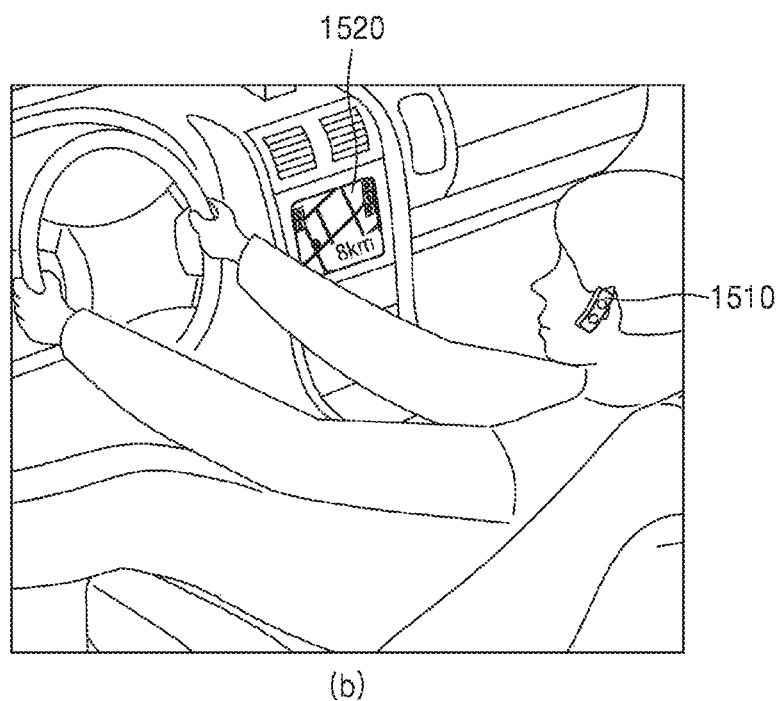
(b)

FIG. 16
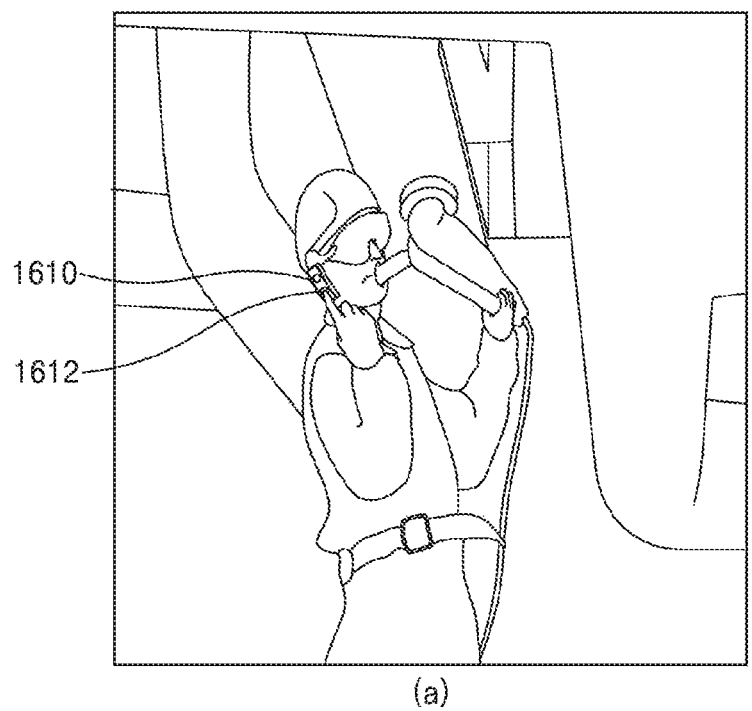
(a)
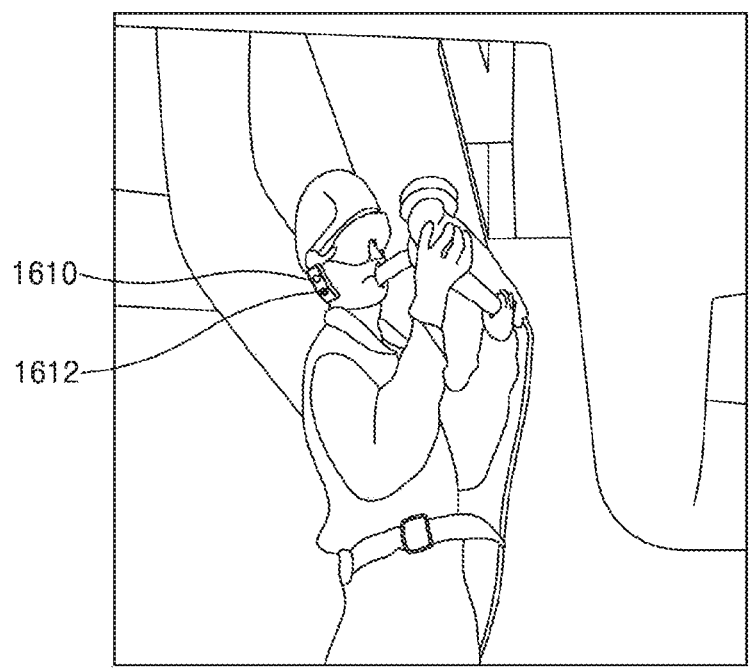
(b)

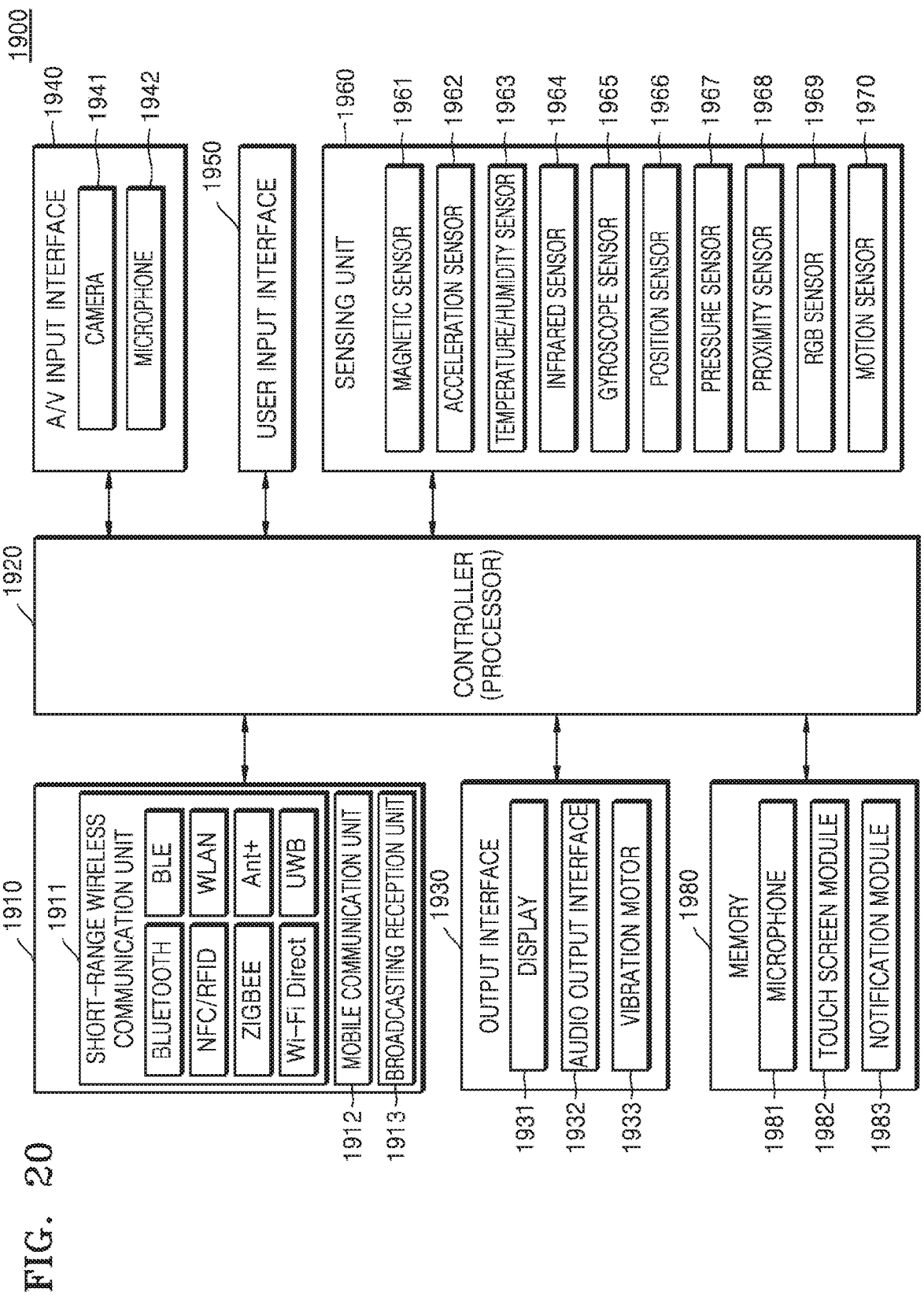

US 10,856,144 B2

METHOD, SERVER, AND TERMINAL FOR TRANSMITTING AND RECEIVING DATA

PRIORITY

This application is a National Phase Entry of PCT International Application No. PCT/KR2016/005905, which was filed on Jun. 3, 2016, and claims priority to Korean Patent Application No. 10-2015-0080025, which was filed on Jun. 5, 2015, the contents of each of which are incorporated herein by reference.

TECHNICAL FIELD

The present invention relates to a method in which a server transmits and receives data, a method in which a terminal transmits and receives data, a terminal that transmits and receives data, a server that transmits and receives data, and a recording medium having recorded thereon programs that perform the methods of transmitting and receiving data.

BACKGROUND ART

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied.

In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via fusion and combination of existing information technology (IT) with various industries.

DETAILED DESCRIPTION OF THE INVENTION

Technical Problem

The present invention provides a method and a device for transmitting and receiving data between a plurality of terminals in order to more efficiently utilize resources necessary for data transmission and reception, and a recording medium having recorded thereon a program that performs the method.

Technical Solution

The present invention provides a method, performed by a server, of transmitting and receiving data, the method including receiving a transmission authority request from at least one terminal from among a plurality of terminals connected to the server; comparing a number of transmitting terminals previously determined by the server with a maximum number of transmitting terminals allowable by the server, in response to the transmission authority request; and determining a transmission authority of the at least one terminal, based on a result of the comparing.

Advantageous Effects

According to an embodiment of the present invention, when data is transmitted and received between a plurality of terminals, a server connected to the plurality of terminals controls the data transmission and reception between the plurality of terminals, whereby resources necessary for the data transmission and reception may be more efficiently utilized.

DESCRIPTION OF THE DRAWINGS

FIG. 15 is a schematic diagram for explaining a method, performed by a terminal, of obtaining a first type transmission authority and transmitting data according to a change in the movement velocity of a user, according to an embodiment of the present invention.

FIG. 16 is a schematic diagram for explaining a method, performed by a terminal, of obtaining a first type transmission authority and transmitting data as a user input is detected, according to an embodiment of the present invention.

FIGS. 19 and 20 are block diagrams of a terminal according to an embodiment of the present invention.

BEST MODE

Figure 1:
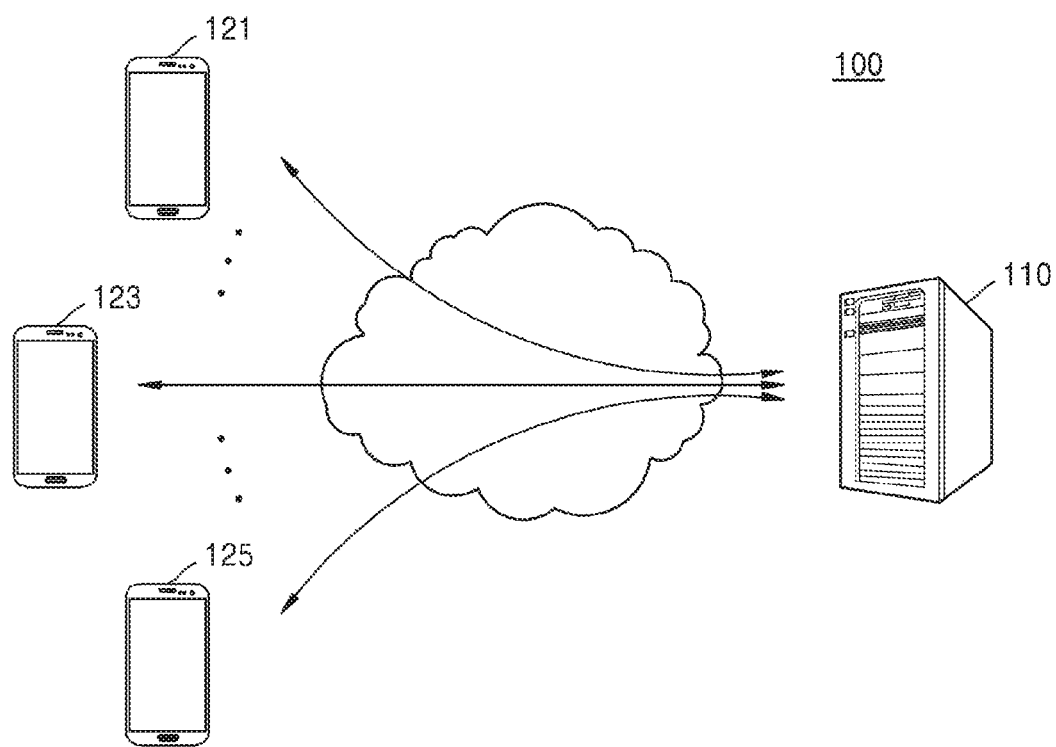
FIG. 1 is a conceptual diagram for describing a system for transmitting and receiving data, according to an embodiment of the present invention.

According to an embodiment of the present invention, the method, performed by a server, of transmitting and receiving data, includes receiving a transmission authority request from at least one terminal from among a plurality of terminals connected to the server, comparing a number of transmitting terminals previously determined by the server with a maximum number of transmitting terminals allowable by the server, in response to the transmission authority request and determining a transmission authority of the at least one terminal, based on a result of the comparing.

According to an embodiment of the present invention, the method further includes receiving data from the at least one terminal when the at least one terminal has obtained the transmission authority and transmitting the received data together with data received from the pre-determined transmitting terminal to another terminal included in the plurality of terminals According to an embodiment of the present invention, the method further includes mixing the data received from the at least one terminal with the data received from the pre-determined transmitting terminal, and the transmitting includes transmitting mixed data to the other terminal included in the plurality of terminals.

According to an embodiment of the present invention, wherein, when data transmission by at least one transmitting terminal from among transmitting terminals that transmit data to the server is completed, the transmission authority is returned to the server.

According to an embodiment of the present invention, the method further includes, when a transmission authority is returned from a data transmission-completed transmitting terminal, re-determining a transmission authority for a terminal not allowed data transmission, according to a determination of the server. According to an embodiment of the present invention, the method includes when the maximum number of transmitting terminals is less than the number of the at least one terminal, selecting some terminals based on the amount of each of the at least one terminal used and allowing the selected some terminals to have a transmission authority According to an embodiment of the present invention, the method performed by a terminal, of transmitting and receiving data, includes transmitting a transmission authority request to the server by one terminal from among a plurality of terminals connected to the server, receiving information about a transmission authority of the terminal determined based on a number of transmitting terminals previously determined by the server and a maximum number of transmitting terminals allowable by the server and transmitting data to the server according to the received information about the transmission authority.

According to an embodiment of the present invention, wherein when the terminal has obtained a transmission authority, the data together with data of the pre-determined transmitting terminal is transmitted to another terminal included in the plurality of terminals.

According to an embodiment of the present invention, the method further includes receiving data from each of at least one transmitting terminal having obtained a transmission authority from the server from among the plurality of terminals and mixing the data received from each of the at least one transmitting terminal.

According to an embodiment of the present invention, the method further includes, when a transmission authority is not obtained from the server and a transmission authority is returned from a data transmission-completed transmitting terminal, obtaining the returned transmission authority.

According to an embodiment of the present invention, the server for transmitting and receiving data, includes, a receiver configured to receive a transmission authority request from at least one terminal from among a plurality of terminals connected to the server, a controller configured to compare a number of transmitting terminals previously determined by the server with a maximum number of transmitting terminals allowable by the server in response to the transmission authority request so as to determine a transmission authority of the at least one terminal and a transmitter configured to transmit the determined transmission authority to the at least one terminal.

According to an embodiment of the present invention, the receiver receives data from the at least one terminal when the at least one terminal has obtained the transmission authority, and the transmitter transmits the received data together with data received from the pre-determined transmitting terminal to another terminal included in the plurality of terminals.

According to an embodiment of the present invention, the controller mixes the data received from the at least one terminal with the data received from the pre-determined transmitting terminal, and the transmitter transmits mixed data to the other terminal included in the plurality of terminals.

According to an embodiment of the present invention, when data transmission by at least one transmitting terminal from among transmitting terminals that transmit data to the server is completed, the transmission authority is returned to the server.

According to an embodiment of the present invention, when a transmission authority is returned from a data transmission-completed transmitting terminal, the controller re-determines a transmission authority for a terminal not allowed data transmission, according to a determination of the server.

According to an embodiment of the present invention, when the maximum number of transmitting terminals is less than the number of the at least one terminal, the controller selects some terminals based on the amount of each of the at least one terminal used and allows the selected some terminals to have a transmission authority.

According to an embodiment of the present invention, the terminal for transmitting and receiving data includes a communicator configured to transmit a transmission authority request to a server and receive information about a transmission authority of the terminal determined based on a number of transmitting terminals previously determined by the server and a maximum number of transmitting terminals allowable by the server and a controller configured to process data that is to be transmitted to the server, according to the received information about the transmission authority, wherein the communicator transmits the data to the server.

According to an embodiment of the present invention, when the one terminal has obtained a transmission authority, the data together with data of the pre-determined transmitting terminal is transmitted to another terminal included in the plurality of terminals.

According to an embodiment of the present invention, the communicator receives data from each of at least one transmitting terminal having obtained a transmission authority from the server from among the plurality of terminals, and the controller mixes the data received from each of the at least one transmitting terminal According to an embodiment of the present invention, when a transmission authority is not obtained from the server and a transmission authority is returned from a data transmission-completed transmitting terminal, the terminal obtains the returned transmission authority.

MODE OF THE INVENTION

Hereinafter, the terms used in the specification will be briefly described, and then the present invention will be described in detail.

Although general terms widely used at present were selected for describing the present invention in consideration of the functions thereof, these general terms may vary according to intentions of one of ordinary skill in the art, case precedents, the advent of new technologies, and the like. Terms arbitrarily selected by the applicant of the present invention may also be used in a specific case. In this case, their meanings need to be given in the detailed description of the invention. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Embodiments of the present invention are described in detail herein with reference to the accompanying drawings so that this disclosure may be easily performed by one of ordinary skill in the art to which the present invention pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a conceptual diagram for describing a system 100 for transmitting and receiving data, according to an embodiment of the present invention.

The system 100 for transmitting and receiving data may include a server 110 and a plurality of terminals 121, 123, and 125.

Only components related with the present embodiment from among the components of the system 100 for transmitting and receiving data are shown in FIG. 1. It will be understood by one of ordinary skill in the art related with the present embodiment that general-use components other than the components illustrated in FIG. 1 may be further included. For example, the system 100 of FIG. 1 for transmitting and receiving data may further include at least one terminal in addition to the first terminal 121, the second terminal 123, and the third terminal 125.

The server 110 is a computing device having the ability to calculate data and capable of performing wired communication or wireless communication. The server 110 may communicate with the plurality of terminals 121, 123, and 125.

The server 110 according to an embodiment may receive data from some (e.g., the terminal 121) of the plurality of terminals 121, 123, and 125. The server 110 may transmit the received data to the other terminals (e.g., the terminals 123 and 125).

A maximum transmitting terminal number representing the number of transmission-allowed terminals may be previously set in the server 110. For example, when the maximum transmitting terminal number pre-set in the server 110 is 2, the server 110 may receive data from at most two terminals. The server 110 may determine whether to allow transmission of terminals that request the server 110 for a transmission authority, according to the preset maximum transmitting terminal number. A terminal allowed by the server 110 to perform transmission will now be described as a transmitting terminal.

Even when there is a terminal (for example, the terminal 121) that has already been transmitting data to the server 110, the server 110 may receive data from another terminal (for example, the terminal 123). The server 110 may transmit data received from each of the terminals 121 and 123 to the other terminals. For example, the server 110 may transmit data transmitted by the first terminal 121 to the second terminal 123 and the third terminal 125. The server 110 may transmit data transmitted by the second terminal 123 to the first terminal 121 and the third terminal 125.

The plurality of terminals 121, 123, and 125 according to an embodiment may perform communication with other terminals according to a Push To Talk (PTT) method. For example, the plurality of terminals 121, 123, and 125 may perform communication using an IP-based PTT method. The IP-based PTT method is a communication technique that is performed using streaming techniques, such as a real-time transmission protocol (RTP) and a real-time streaming protocol (RTSP).

At least one terminal (for example, the terminal 121) may obtain a transmission authority from the server 110 in order to transmit data to another terminal. The at least one terminal (for example, the terminal 121) may request the server 110 for a transmission authority, before transmitting data to the server 110. When the terminal having requested a transmission authority (for example, the terminal 121) obtains the transmission authority, the terminal (for example, the terminal 121) may transmit data to the server 110. While the terminal having obtained the transmission authority is transmitting data to the server 110, the terminal may receive data of another terminal having obtained a transmission authority from the server 110.

On the other hand, when the terminal having requested the transmission authority (for example, the terminal 121) does not obtain the transmission authority, the terminal (for example, the terminal 121) is not able to transmit data to the server 110. The terminal having obtained no transmission authorities from the server 100 may receive, from the server 110, data transmitted to the server 110 by another terminal having obtained a transmission authority.

Examples of the plurality of terminals 121, 123, and 125 described herein may include, but are not limited to, smartphones, laptop computers, tablet PCs, and wearable devices.

The server 110 is merely an example distinguished from the plurality of terminals 121, 123, and 125 in terms of operation, and one of the plurality of terminals may perform an operation of the server 110. This will now be described in greater detail with reference to FIG. 10.

Figure 2:
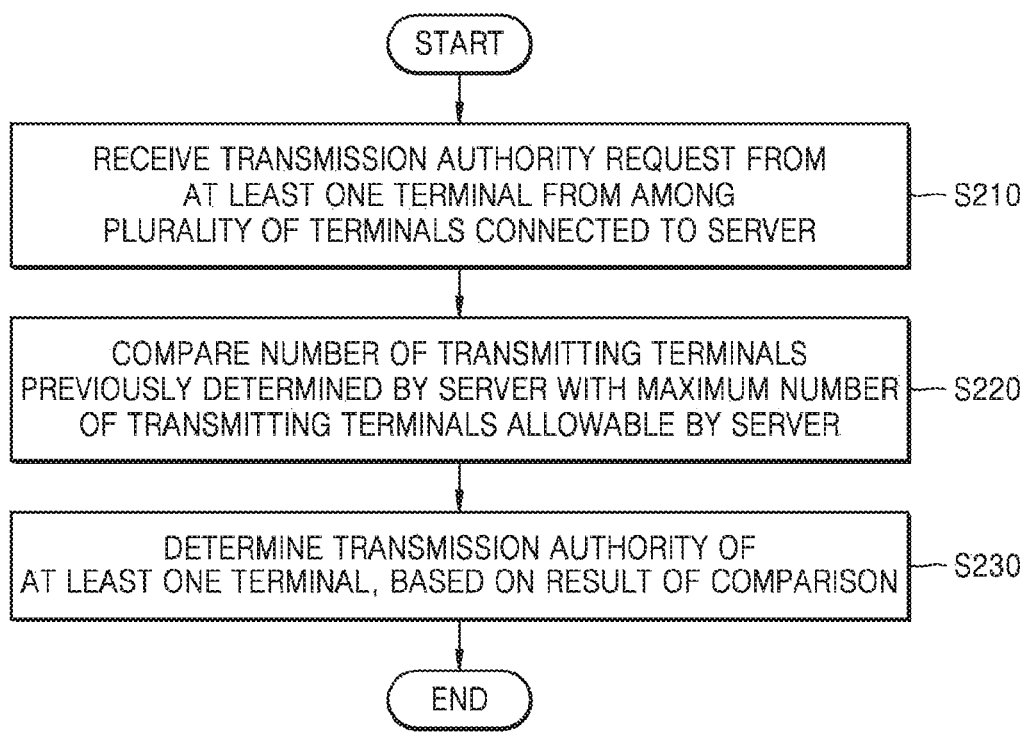
FIG. 2 is a flowchart of a method, performed by a server, of transmitting and receiving data to or from a plurality of terminals, according to an embodiment of the present invention.

FIG. 2 is a flowchart of a method, performed by the server 110, of transmitting and receiving data to or from the plurality of terminals 121, 123, and 125, according to an embodiment of the present invention.

In operation S210, the server 110 receives a transmission authority request from at least one terminal (for example, 121) from among the plurality of terminals 121, 123, and 125 connected to the server 110.

The server 110 may receive a call setting signal for communication connection from each of the plurality of terminals 121, 123, and 125. The server 110 may designate the plurality of terminals 121, 123, and 125 as one group, based on the call setting signals respectively received from the plurality of terminals 121, 123, and 125. The call setting signals may include information about the plurality of terminals 121, 123, and 125 included in the same group, and information representing group communication.

The server 110 may receive a transmission authority request from the first terminal 121 from among the plurality of terminals 121, 123, and 125 included in the same group. The transmission authority request of the first terminal 121 received by the server 110 may include, but is not limited to, identification (ID) information of the first terminal 121 and ID information designating group communication.

Alternatively, the server 110 may receive transmission authority requests from at least two terminals (e.g., 121 and 123) from among the plurality of terminals 123, 123, and 124 included in the same group.

In operation S220, in response to the transmission authority request, the server 110 compares the number of transmitting terminals previously determined by the server 110 with the maximum number of transmitting terminals allowable by the server 110.

The pre-determined transmitting terminal refers to a terminal already given a transmission authority at the moment when the server 110 receives a transmission authority request. When there is a pre-determined transmitting terminal, the server 110 may receive data from the pre-determined transmitting terminal until the transmission authority is released.

The maximum number of allowable transmitting terminals may be previously set in the server 110.

The server 110 according to an embodiment may compare the number of terminals already given a transmission authority at the moment when the server 110 receives a transmission authority request with the maximum number of allowable transmitting terminals.

In operation S230, the server 110 determines a transmission authority of the at least one terminal (for example, 121), based on a result of the comparison.

For smooth communication with the plurality of terminals 121, 123, and 125, the server 100 may not allow terminals, the number of which exceeds the maximum number of transmitting terminals, to transmit data to the server 110. For example, when the maximum number of transmitting terminals is 2, the server 110 may not allow at least three terminals to transmit data to the server 110 at the same time.

When a sum of the preset number of transmitting terminals and the number of at least one terminal (for example, 121) having requested a transmission authority exceeds the maximum number of transmitting terminals, the server 100 according to an embodiment may not allow only some terminals to have transmission authorities. In this case, the server 100 may allow none of the at least one terminal (for example, 121) to have a transmission authority. A method in which the server 100 allows only some terminals to have transmission authorities will be described in more detail with reference to FIG. 7.

The server 100 may transmit information about a transmission authority to a terminal. For example, the server 100 may transmit a transmission authority reject message representing that a transmission authority is not allowed, to a terminal not allowed to have a transmission authority. As another example, the server 100 may transmit a transmission authority reject message to all of the plurality of terminals 121, 123, and 125 included in the same group. As another example, the server 100 may transmit the transmission authority reject message to terminals having no transmission authorities from among the plurality of terminals 121, 123, and 125 included in the same group.

On the other hand, when the sum of the preset number of transmitting terminals and the number of at least one terminal (for example, 121) having requested a transmission authority does not exceed the maximum number of transmitting terminals, the server 100 may allow the at least one terminal (for example, 121) to have a transmission authority.

The server 100 may transmit a transmission authority allow message to a terminal allowed to have a transmission authority. The server 100 may receive data from the terminal allowed a transmission authority, and transmit the data to other terminals included in the same group.

When the server 100 receives data from at least two terminals allowed transmission authority, the sever 100 may mix the respective pieces of data of the at least two terminals with each other and a result of the mixing to another terminal. This will now be described in greater detail with reference to FIG. 6.

Figure 3:
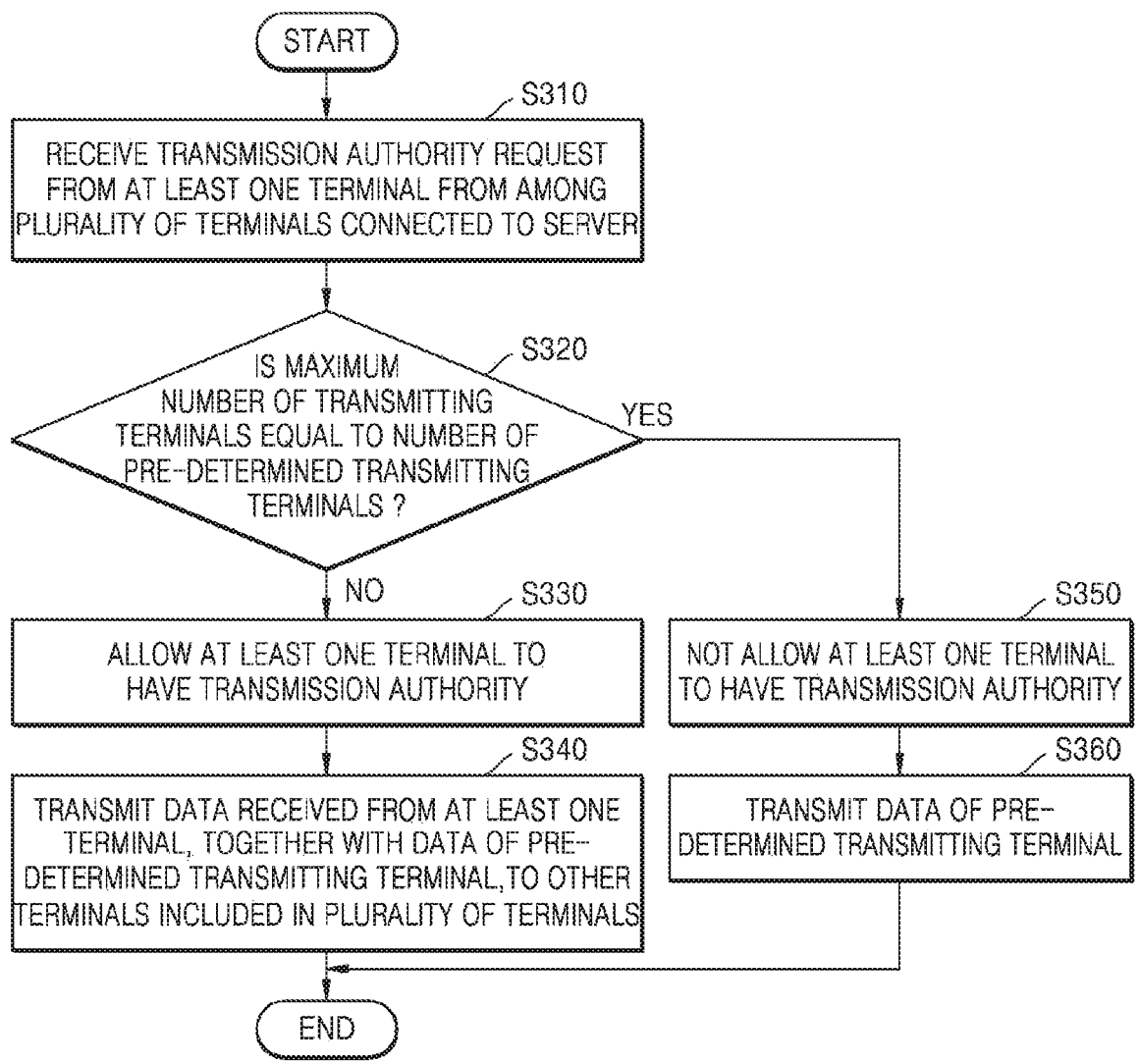
FIG. 3 is a flowchart of a method, performed by a server, of giving transmission authorities to a plurality of terminals, according to an embodiment of the present invention.

FIG. 3 is a flowchart illustrating in detail a method, performed by the server 110, of giving transmission authorities to the plurality of terminals 121, 123, and 125, according to an embodiment of the present invention.

FIG. 3 illustrates a case where the server 110 receives a transmission authority request from a single terminal.

In operation S310, the server 110 may receive a transmission authority request from at least one terminal (for example, 121) from among the plurality of terminals 121, 123, and 125 connected to the server 110.

The server 110 may receive a transmission authority request from one terminal (for example, 121) from among the plurality of terminals 121, 123, and 125 included in a group preset in the server.

Operation S310 may correspond to operation S210 described above with reference to FIG. 2.

In operation S320, the server 110 may determine whether the maximum number of transmitting terminals is equal to the number of pre-determined transmitting terminals.

The server 110 may compare the preset maximum number of transmitting terminals with the number of pre-determined transmitting terminals. At least one terminal (for example, 121) allowed transmission authority to the server 110 may exist. The server 110 may receive data from the at least one terminal (for example, 121) allowed transmission authority.

However, this is merely an embodiment, and no transmitting terminals pre-determined in the server 110 exist at the moment when the server 110 receives a transmission authority request from the at least one terminal (for example, 121).

In operation S330, the server 110 may allow the at least one terminal to have a transmission authority.

When the number of pre-determined transmitting terminals is less than the maximum number of transmitting terminals, the server 110 may allow the at least one terminal to have a transmission authority. For example, when the number of pre-determined transmitting terminals is 1 and the maximum number of transmitting terminals is 2, the server 110 may allow the first terminal 121 to have requested transmission authority.

In operation S340, the server 110 may transmit data received from the at least one terminal, together with data of a pre-determined transmitting terminal, to the other terminals included in the plurality of terminals.

The server 110 may receive data from a terminal allowed to have a transmission authority. When there is a pre-determined transmitting terminal, the server 110 may receive data from the pre-determined transmitting terminal. The server 110 may transmit the data of the terminal allowed to have a transmission authority, together with the data received from the pre-determined transmitting terminal, to the other terminals included in the same group.

For example, when the first terminal 121 from among the plurality of terminals 121, 123, and 125 requests the server 110 for a transmission authority and the second terminal 123, being a pre-determined transmitting terminal the server 110 may transmit data received from the first terminal 121 and data received from the second terminal 123 to the third terminal 125. The server 110 may mix the data received from the first terminal 121 with the data received from the second terminal 123. However, this is merely an embodiment of the present invention, and the present invention is not limited thereto.

The server 110 may transmit the data received from the second terminal 123 to the first terminal 121. The server 110 may transmit the data received from the first terminal 121 to the second terminal 123.

In operation S350, the server 110 may not allow the at least one terminal to have a transmission authority.

When the number of pre-determined transmitting terminals is equal to the maximum number of transmitting terminals, the server 110 may not allow the at least one terminal to have a transmission authority. For example, when the number of pre-determined transmitting terminals is 2 and the maximum number of transmitting terminals is 2, the server 110 may not allow the transmission authority requested by the first terminal 121.

The server 110 may transmit a transmission authority reject message to the first terminal 121 not allowed to have a transmission authority. As another example, the server 110 may transmit a transmission authority reject message to all of the plurality of terminals 121, 123, and 125 included in the same group, or may transmit a transmission authority reject message to some terminals having no transmission authorities from among the plurality of terminals 121, 123, and 125.

In operation S360, the server 110 may transmit the data of a pre-determined transmitting terminal to another terminal included in the plurality of terminals.

The server 110 may transmit the data received from the pre-determined transmitting terminal to other terminals. The plurality of terminals 121, 123, and 125 included in the same group may receive data except for data transmitted by plurality of terminals 121, 123, and 125 from among data transmitted to the server 110. For example, when transmitting terminals pre-determined in the server 110 are the second terminal 123 and the third terminal 125, the first terminal 121 not allowed transmission authority may receive the data of the second terminal 123 and the data of the third terminal 125 from the server 110. The second terminal 123 may receive the data of the third terminal 125 from the server 110, and the third terminal 125 may receive the data of the second terminal 123 from the server 110.

Figure 4:
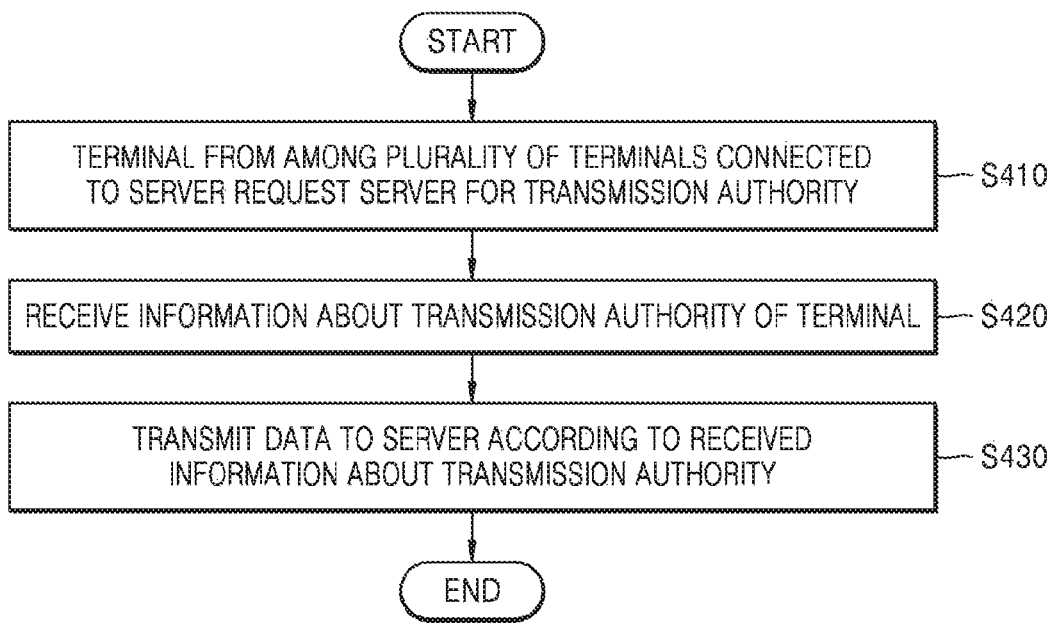
FIG. 4 is a flowchart of a method, performed by a first terminal from among a plurality of terminals, of transmitting and receiving data to or from the other terminals via a server, according to an embodiment of the present invention.

FIG. 4 is a flowchart of a method, performed by the first terminal 121 from among the plurality of terminals 121, 123, and 125, of transmitting and receiving data with the other terminals, namely, the second and third terminals 123 and 125, via the server 110, according to an embodiment of the present invention.

In operation S410, the first terminal 121 requests the server 110 for a transmission authority.

According to an embodiment, the first terminal 121 may transmit a call setting signal to the server 110. The call setting signal of the first terminal 121 may include information about the other terminals 123 and 125 included in the same group, information representing group communication, and ID information of the first terminal 121.

The first terminal 121 may receive, from the server 110, a call accept signal representing that a call has been set. Alternatively, the first terminal 121 may receive, from the server 110, a call reject signal representing that a call is not set. However, in the example of FIG. 4, it is assumed that a call for group communication has been set for the first terminal 121 and the server 110.

The first terminal 121 may perform group communication with the other terminals 123 and 125 via the server 110. The first terminal 121 may receive from the server 110 data transmitted to the server 110 by at least one terminal (for example, 123) from among the other terminals 123 and 125 included in the same group.

The first terminal 121 may transmit data to the other terminals 123 and 125 included in the same group. The first terminal 121 may request the server 110 for a transmission authority before transmitting the data to the other terminals 123 and 125 included in the same group.

In operation S420, the first terminal 121 receives information about a transmission authority of the first terminal 121 determined based on the number of transmitting terminals pre-determined in the server 110 and the maximum number of transmitting terminals allowable by the server 110.

As the first terminal 121 requests the server 110 for a transmission authority, the first terminal 121 may receive a response to the request. For example, the server 110 may transmit a transmission authority allow message or a transmission authority reject message to the first terminal 121.

The server 110 may compare the maximum number of allowable transmitting terminals with the number of predetermined transmitting terminals to thereby determine whether to allow the first terminal 121 to have a transmission authority.

When the number of pre-determined transmitting terminals is equal to the maximum number of allowable transmitting terminals, the server 110 may not allow the first terminal 121 to have a transmission authority. When the server 110 allows the first terminal 121 to have a transmission authority, the first terminal 121 may receive a transmission authority allow message from the server 110.

On the other hand, when the number of pre-determined transmitting terminals is less than the maximum number of allowable transmitting terminals, the server 110 may allow the first terminal 121 to have a transmission authority. When the server 110 does not allow the first terminal 121 to have a transmission authority, the first terminal 121 may receive a transmission authority reject message from the server 110.

In operation S430, the first terminal 121 transmits data to the server 110 according to the received information about the transmission authority.

When the first terminal 121 is allowed to have a transmission authority, the first terminal 121 may transmit data to the server 110. The data transmitted by the first terminal 121 to the server 110 may be transmitted by the server 110 to the other terminals 123 and 125 included in the same group.

On the other hand, when the first terminal 121 is not allowed to have a transmission authority, the first terminal 121 may receive, from the server 110, data transmitted to the server 110 by another terminal (for example, 123) allowed to have a transmission authority.

Figure 5:
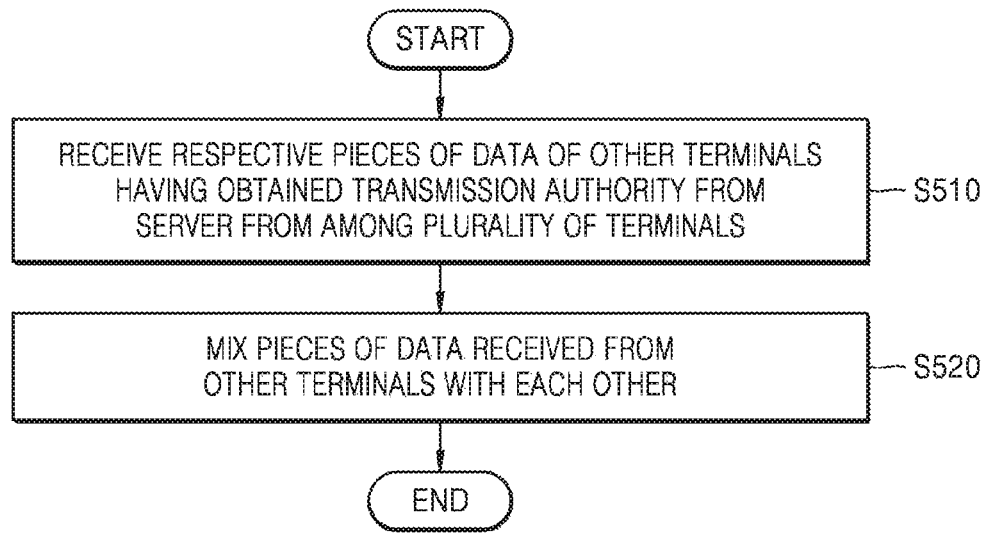
FIG. 5 is a flowchart of a method, performed by the first terminal, of receiving respective pieces of data of the other terminals from the server, according to an embodiment of the present invention.

FIG. 5 is a flowchart of a method, performed by the first terminal 121, of receiving data of the other terminals 123 and 125 from the server 110, according to an embodiment of the present invention.

In operation S510, the first terminal 121 may receive, from the server 110, respective pieces of data of the other terminals 123 and 125 for which group communication has been set. The other terminals 123 and 125 are terminals allowed by the server 110 to have transmission authority.

The first terminal 121 allowed to have a transmission authority may receive data from the server 110 while transmitting data to the server 110.

In operation S520, the first terminal 121 may mix the pieces of data received from the server 110 with each other.

The first terminal 121 may mix the pieces of data received from the server 110 with each other. By mixing the pieces of data received from the server 110 with each other, the first terminal 121 may simultaneously output the respective pieces of data of the other terminals 123 and 125. For example, when a group voice call is performed among users of the first terminal 121, the second terminal 123, and the third terminal 125, the first terminal 121 may simultaneously output respective pieces of voice data of the users of the second terminal 123 and the third terminal 125 via mixing.

Figure 6:
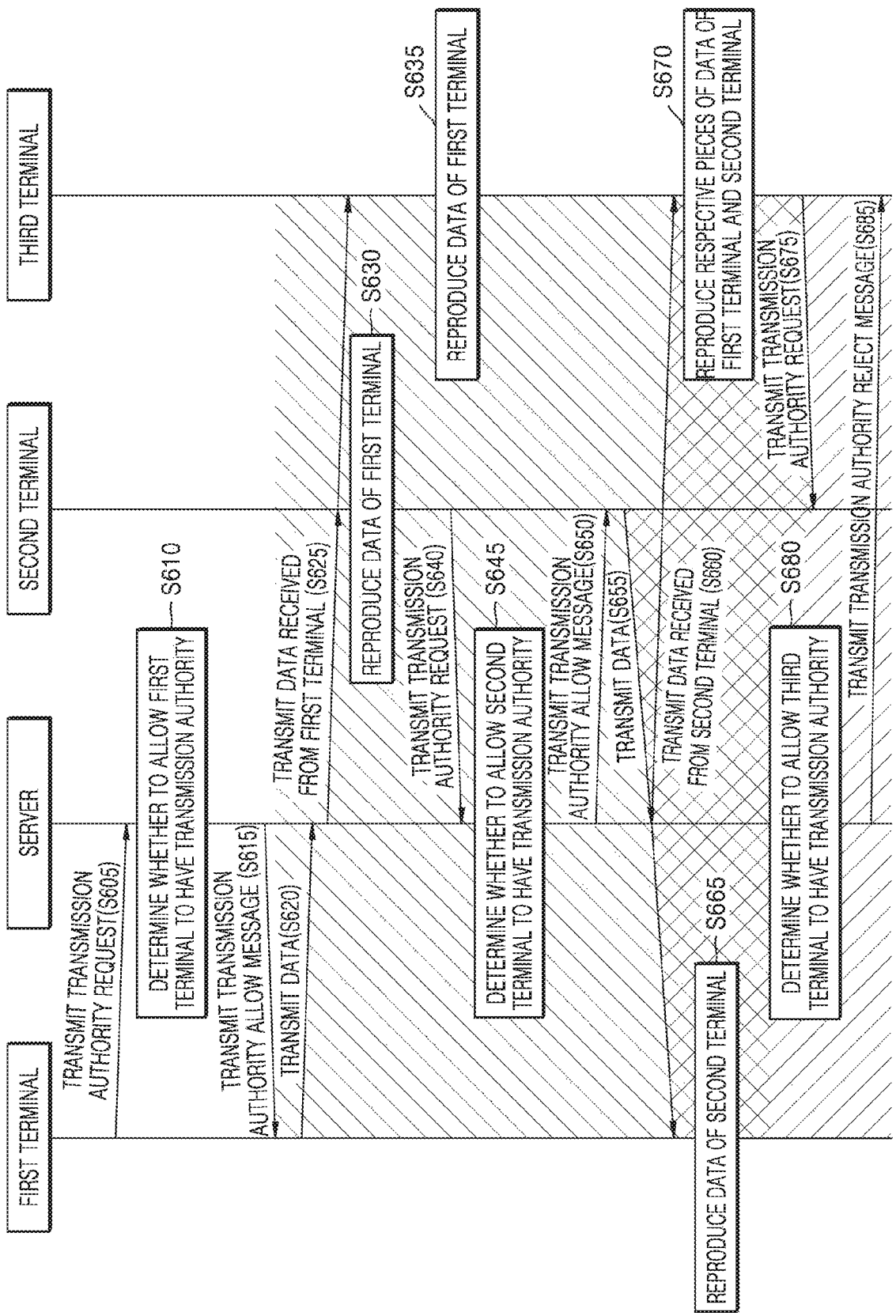
FIG. 6 is a flowchart illustrating in detail of a method, performed by a server, of transmitting and receiving data to or from a plurality of terminals, according to an embodiment of the present invention.

FIG. 6 is a flowchart of a method of transmitting and receiving data between the server 110 and the plurality of terminals 121, 123, and 125, according to an embodiment of the present invention.

Referring to FIG. 6, the server 110 may receive call setting signals from the first terminal 121, the second terminal 123, and the third terminal 125, respectively. It will now be assumed that a call for communication between the server 110 and each of the first terminal 121, the second terminal 123, and the third terminal 125 has been set. It will also be assumed that the maximum number of transmitting terminals previously set by the server 110 is 2.

In operation S605, the first terminal 121 may transmit a transmission authority request to the server 110.

In operation S610, as the server 110 receives the transmission authority request from the first terminal 121, the server 110 may determine whether to allow the first terminal 121 to have a transmission authority. The server 110 may determine whether the number of transmitting terminals allowed transmission authority is equal to the maximum number of transmitting terminals. Because no terminals have already been allowed to have a transmission authority, the server 110 may allow the first terminal 121 to have a transmission authority.

In operation S615, as the server 110 allows the first terminal 121 to have a transmission authority, the server 110 may transmit a transmission authority allow message to the first terminal 121.

In operation S620, as the first terminal 121 receives the transmission authority allow message from the server 110, the first terminal 121 may transmit data to the server 110. The data may be transmitted to the server 110 via streaming.

In operation S625, the server 110 may transmit the data received from the first terminal 121 to each of the second terminal 123 and the third terminal 125.

In operation S630, the second terminal 123 may reproduce the data of the first terminal 121 received from the server 110.

In operation S635, the third terminal 125 may reproduce the data of the first terminal 121 received from the server 110.

In operation S640, the second terminal 123 may transmit a transmission authority request to the server 110.

In operation S645, as the server 110 receives the transmission authority request from the second terminal 123, the server 110 may determine whether to allow the second terminal 123 to have a transmission authority.

The server 110 may determine whether the number of transmitting terminals allowed transmission authority is equal to the maximum number of transmitting terminals. Because the number of transmitting terminals allowed transmission authority is smaller than the maximum number of transmitting terminals, the server 110 may allow the second terminal 123 to have a transmission authority.

In operation S650, as the server 110 allows the second terminal 123 to have a transmission authority, the server 110 may transmit a transmission authority allow message to the second terminal 123.

In operation S655, as the second terminal 123 receives the transmission authority allow message from the server 110, the second terminal 123 may transmit data to the server 110. At this time, the second terminal 123 may receive the data of the first terminal 121 from the server 110 while transmitting data to the server 110.

In operation S660, the server 110 may transmit the data received from the second terminal 123 to each of the first terminal 121 and the third terminal 125. At this time, the server 110 may continuously receive data from the first terminal 121 and transmit the received data of the first terminal 121 to the second terminal 123 and the third terminal 125.

The server 110 may receive data from each of the first terminal 121 and the second terminal 123 allowed transmission authority, respectively, and may transmit the received data to another terminal. For example, the server 110 may transmit the data of the second terminal 123 to the first terminal 121. The server 110 may also transmit the data of the first terminal 121 to the second terminal 123.

The server 110 may transmit the data of the first terminal 121 and the data of the second terminal 123 to the third terminal 125. According to an embodiment, the server 110 may mix the data of the first terminal 121 with the data of the second terminal 123 and transmit a result of the mixing to the third terminal 125. However, this is merely an embodiment, and the respective pieces of data of the terminals 121 and 123 simultaneously transmitted by the server 110 may be mixed in the third terminal 125.

In operation S665, the first terminal 123 may reproduce the data of the second terminal 123 received from the server 110.

In operation S670, the third terminal 125 may reproduce the respective pieces of data of the first terminal 121 and the second terminal 123 received from the server 110. The third terminal 125 may mix and reproduce the respective pieces of data of the first terminal 121 and the second terminal 123 received from the server 110. As another example, the third terminal 125 may receive mixed data from the server 110 and may reproduce the received mixed data.

In operation S675, the third terminal 125 may transmit a transmission authority request to the server 110.

In operation S680, as the server 100 receives the transmission authority request received from the third terminal 125, the server 110 may determine whether to allow the third terminal 125 to have a transmission authority.

The server 110 may determine whether the number of transmitting terminals allowed transmission authority is equal to the maximum number of transmitting terminals. Because the number of transmitting terminals allowed transmission authority is equal to the maximum number of transmitting terminals, the server 110 may not allow the third terminal 125 to have a transmission authority.

In operation S685, the server 100 may transmit to the third terminal 125 a transmission authority reject message indicating that a transmission authority is not allowed.

As another example, the server 100 may transmit a transmission authority reject message to all of a plurality of terminals included in the same group. The server 100 may transmit to the first terminal 121, the second terminal 123, and the third terminal 125 a transmission authority reject message indicating that a transmission authority is not allowed.

As another example, the server 100 may transmit a transmission authority reject message to all of the terminals not allowed to have transmission authorities from among the plurality of terminals included in the same group.

Figure 7:
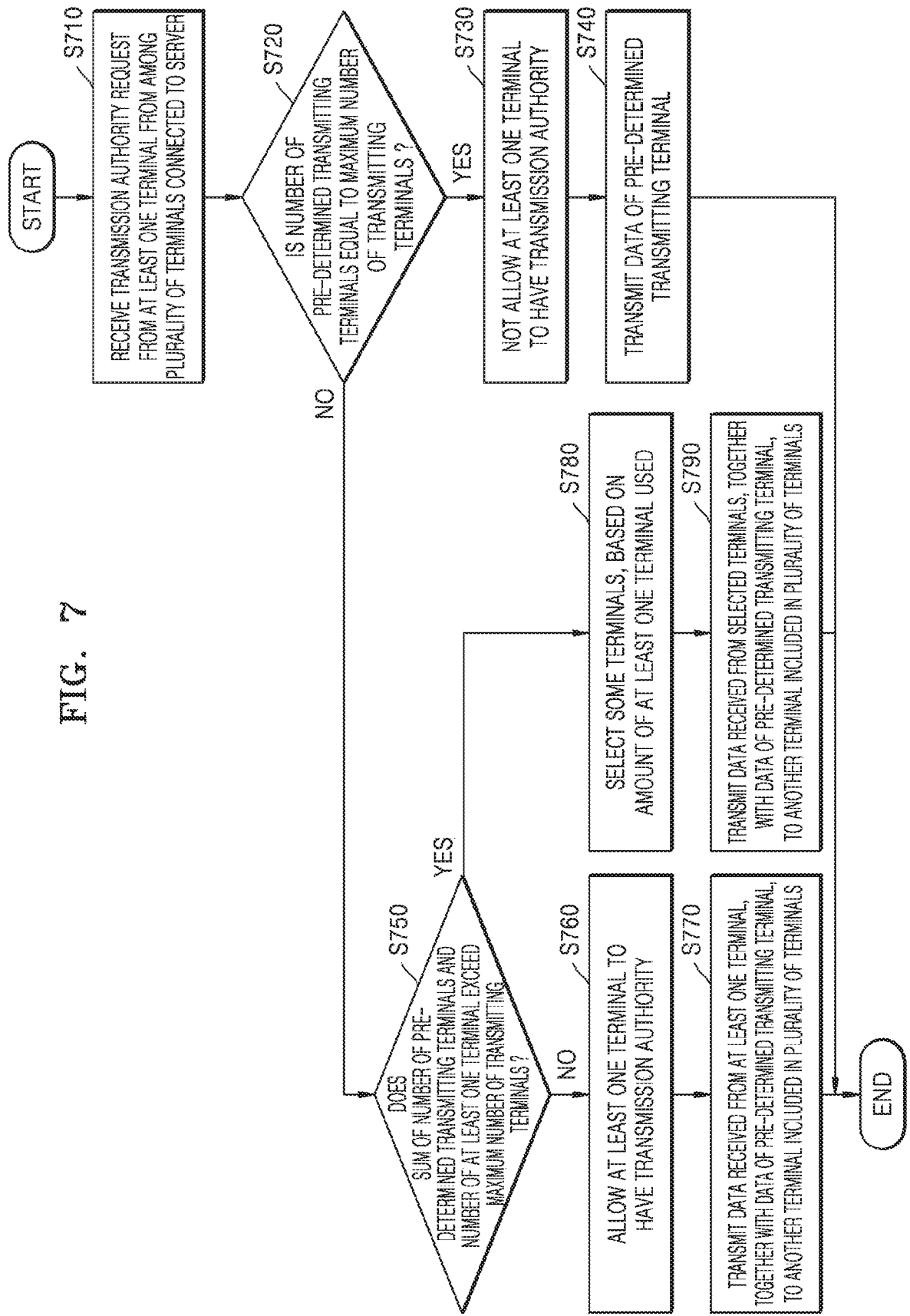
FIG. 7 is a flowchart of a method, performed by the server, of selecting some terminals from at least one terminal having requested the server for a transmission authority and allowing the selected terminals to have transmission authorities, according to an embodiment of the present invention.

FIG. 7 is a flowchart of a method, performed by the server 100, of selecting some terminals from at least one terminal having requested the server 100 for a transmission authority and allowing the selected terminals to have transmission authorities, according to an embodiment of the present invention.

In operation S710, the server 110 may receive a transmission authority request from at least one terminal from among a plurality of terminals connected to the server 110.

In operation S720, in response to the transmission authority request, the server 110 may determine whether the number of pre-determined transmitting terminals is equal to the maximum number of transmitting terminals.

In operation S730, the server 110 may not allow the at least one terminal to have a transmission authority.

When the number of pre-determined transmitting terminals is equal to the maximum number of transmitting terminals, the server 110 according to an embodiment may not allow the transmission authority request received from the at least one terminal.

In operation S740, the server 110 may transmit data of a pre-determined transmitting terminal to another terminal included in the plurality of terminals.

In operation S750, the server 110 may determine whether a sum of the number of pre-determined transmitting terminals and the number of at least one terminal having transmitted a transmission authority request exceeds the maximum number of transmitting terminals.

When the number of pre-determined transmitting terminals is not equal to the maximum number of transmitting terminals, the server 110 may determine whether the sum of the number of pre-determined transmitting terminals and the number of at least one terminal having transmitted the transmission authority request exceeds the maximum number of transmitting terminals.

In operation S760, the server 110 may allow the at least one terminal to have a transmission authority.

When the sum of the number of pre-determined transmitting terminals and the number of at least one terminal having transmitted the transmission authority request does not exceed the maximum number of transmitting terminals, the server 110 may allow all of the at least one terminal to have a transmission authority.

In operation S770, the server 110 may transmit data received from the at least one terminal, together with the data of the pre-determined transmitting terminal, to another terminal included in the plurality of terminals. At this time, the transmitting terminal may receive data of another transmitting terminal except for the data transmitted by the transmitting terminal.

In operation S780, the server 110 may select some terminals from the at least one terminal, based on the amount of the at least one terminal used.

According to an embodiment, the server 110 may obtain information about the amount of the at least one terminal used. The amount of a terminal used may be determined based on, for example, the amount of data input from a user or an external device to the terminal, and the number of times data is input. The information about the amount of the at least one terminal used may be included in the transmission authority request received from the at least one terminal.

However, this is merely an embodiment of the present invention, and the server 110 may obtain information about the amount of the at least one terminal used as a signal separate from a message corresponding to the transmission authority request. As another example, the server 110 may receive information about the amount used from each of a plurality of terminals for which a call has been set at preset intervals.

In operation S790, the server 110 may transmit data received from the selected terminals, together with the data of the pre-determined transmitting terminal, to another terminal included in the plurality of terminals.

Figure 8:
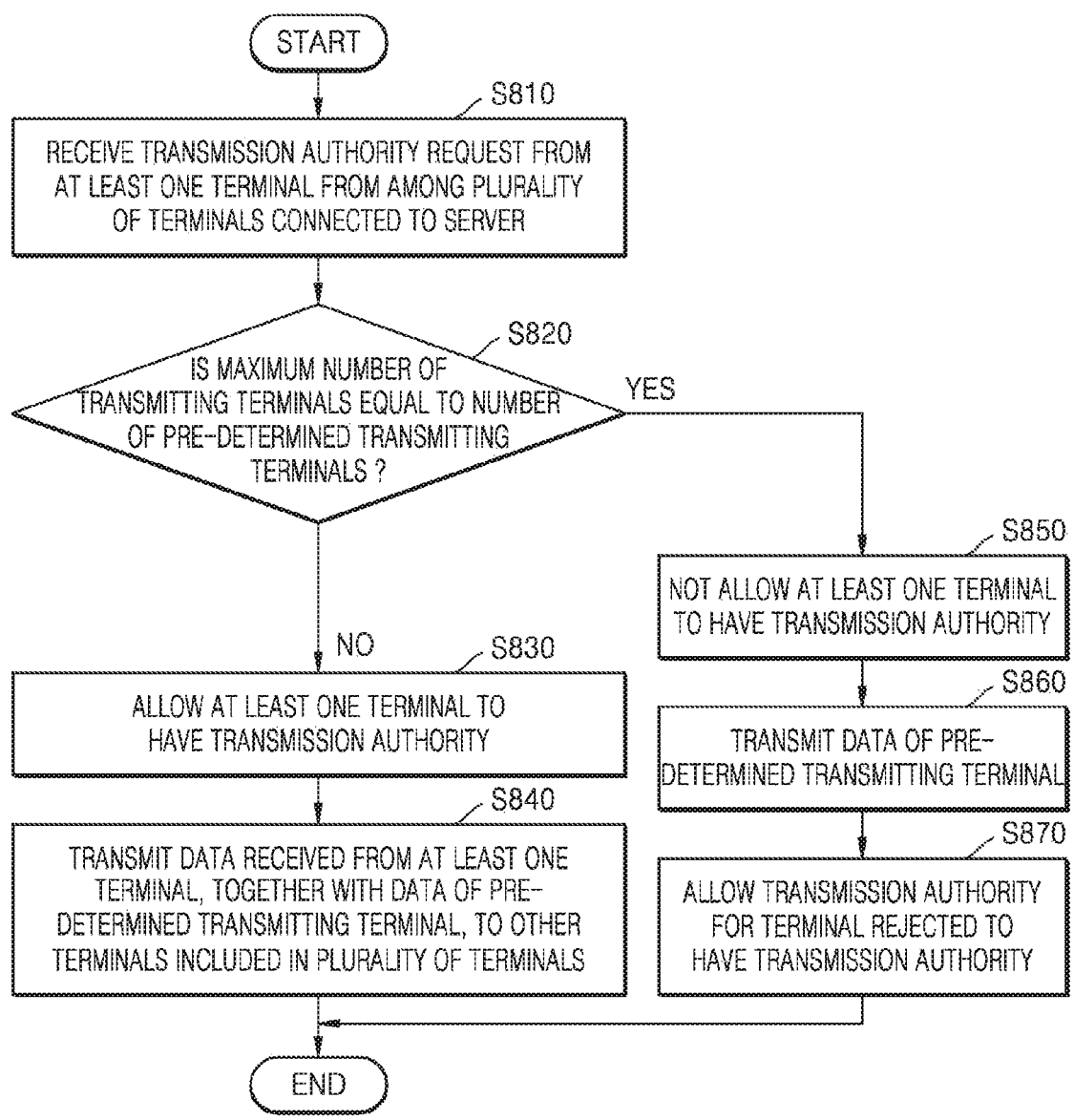
FIG. 8 is a flowchart of an operation of a server when a transmission authority is returned from a transmitting terminal after the server does not allow a transmission authority request of a terminal, according to an embodiment of the present invention.

FIG. 8 is a flowchart of an operation of the server 110 when a transmission authority is returned from a transmitting terminal after the server 110 does not allow a transmission authority request of a terminal, according to an embodiment of the present invention.

In operation S810, the server 110 may receive a transmission authority request from at least one terminal (e.g., 121) from among the plurality of terminals 121, 123, and 125 connected to the server 110.

The server 110 may receive a transmission authority request from one terminal (for example, 121) from among the plurality of terminals 121, 123, and 125 included in a group preset in the server.

Operation S810 may correspond to operation S210 described above with reference to FIG. 2.

In operation S820, the server 110 may determine whether the maximum number of transmitting terminals is equal to the number of pre-determined transmitting terminals.

The server 110 may compare the preset maximum number of transmitting terminals with the number of pre-determined transmitting terminals. At least one terminal (for example, 121) allowed transmission authority may exist in the server 110. The server 110 may receive data from the at least one terminal (for example, 121) allowed transmission authority.

In operation S830, the server 110 may allow the at least one terminal to have a transmission authority.

Operation S830 may correspond to operation S330 described above with reference to FIG. 3.

In operation S840, the server 110 may transmit data received from the at least one terminal, together with data of a pre-determined transmitting terminal, to another terminal included in the plurality of terminals.

Operation S840 may correspond to operation S340 described above with reference to FIG. 3.

In operation S850, the server 110 may not allow the at least one terminal to have a transmission authority. When the maximum number of transmitting terminals is equal to the number of pre-determined transmitting terminals, the server 110 may not allow the at least one terminal to have a transmission authority.

In operation S860, the server 110 may receive a return of a transmission authority from the pre-determined transmitting terminal. When the transmitting terminal has completed transmitting data to all of the other terminals, the transmitting terminal may return its transmission authority to the server 110.

In operation S870, as the transmission authority is returned, the server 110 may give a transmission authority to a terminal rejected to have a transmission authority.

Figure 9:
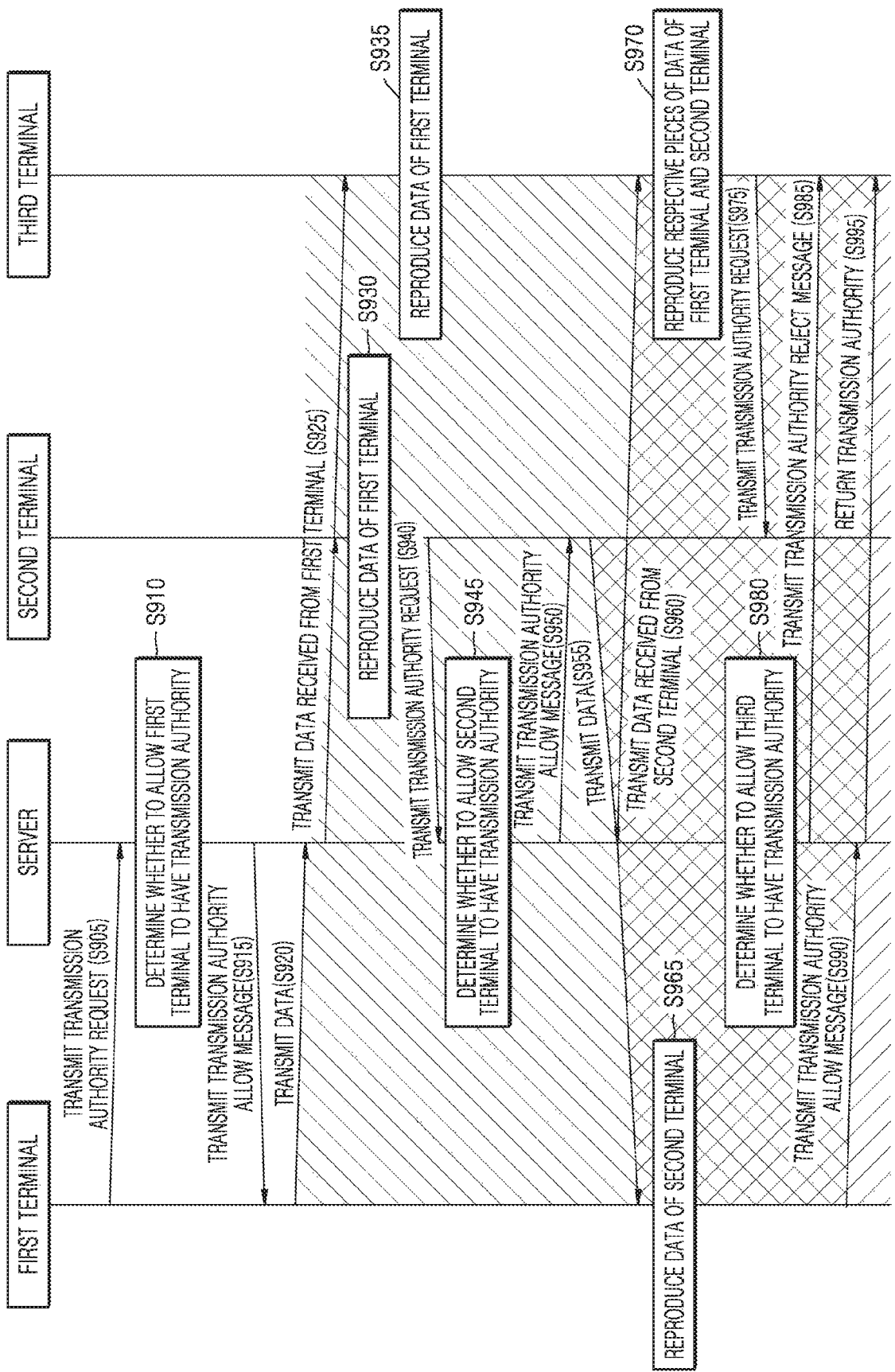
FIG. 9 is a flowchart illustrating in detail an operation of a server when a transmission authority is returned from a transmitting terminal after the server does not allow a transmission authority request of a terminal, according to an embodiment of the present invention.

FIG. 9 is a flowchart illustrating in detail an operation of the server 110 when a transmission authority is returned from a transmitting terminal after the server 110 does not allow a transmission authority request of a terminal, according to an embodiment of the present invention.

In operation S905, the first terminal 121 may transmit a transmission authority request to the server 110.

In operation S910, as the server 110 receives the transmission authority request from the first terminal 121, the server 110 may determine whether to allow the first terminal 121 to have a transmission authority.

In operation S915, as the server 110 allows the first terminal 121 to have a transmission authority, the server 110 may transmit a transmission authority allow message to the first terminal 121.

In operation S920, as the first terminal 121 receives the transmission authority allow message from the server 110, the first terminal 121 may transmit data to the server 110. The data may be transmitted to the server 110 via streaming.

In operation S925, the server 110 may transmit the data received from the first terminal 121 to each of the second terminal 123 and the third terminal 125.

In operation S930, the second terminal 123 may reproduce the data of the first terminal 121 received from the server 110.

In operation S935, the third terminal 125 may reproduce the data of the first terminal 121 received from the server 110.

Operations S930 and S935 have been described sequentially for just convenience of explanation. Operations S930 and S935 may be performed at the same time, or operation S935 may be performed prior to operation S930.

In operation S940, the second terminal 123 may transmit a transmission authority request to the server 110.

In operation S945, as the server 110 receives the transmission authority request from the second terminal 123, the server 110 may determine whether to allow the second terminal 123 to have a transmission authority.

The server 110 according to an embodiment of the present invention may determine whether the number of transmitting terminals allowed transmission authority is equal to the maximum number of transmitting terminals. Because the number of transmitting terminals allowed transmission authority is smaller than the maximum number of transmitting terminals, the server 110 may allow the second terminal 123 to have a transmission authority.

In operation S950, as the server 110 allows the second terminal 123 to have a transmission authority, the server 110 may transmit a transmission authority allow message to the second terminal 123.

In operation S955, as the second terminal 123 receives the transmission authority allow message from the server 110, the second terminal 123 may transmit data to the server 110. At this time, the second terminal 123 may receive the data of the first terminal 121 from the server 110 while transmitting data to the server 110.

In operation S960, the server 110 may transmit the data received from the second terminal 123 to each of the first terminal 121 and the third terminal 125. At this time, the server 110 may continuously receive data from the first terminal 121 and transmit the received data of the first terminal 121 to the second terminal 123 and the third terminal 125.

In operation S965, the first terminal 123 may reproduce the data of the second terminal 123 received from the server 110.

In operation S970, the third terminal 125 may reproduce the respective pieces of data of the first terminal 121 and the second terminal 123 received from the server 110.

Operations S965 and S970 have been described sequentially for just convenience of explanation. Operations S965 and S970 may be performed at the same time, or operation S970 may be performed prior to operation S965.

In operation S975, the third terminal 125 may transmit a transmission authority request to the server 110.

In operation S980, as the server 100 receives the transmission authority request from the third terminal 125, the server 110 may determine whether to allow the third terminal 125 to have a transmission authority.

The server 110 according to an embodiment of the present invention may determine whether the number of transmitting terminals allowed transmission authority is equal to the maximum number of transmitting terminals. Because the number of transmitting terminals allowed transmission authority is equal to the maximum number of transmitting terminals, the server 110 may not allow the third terminal 125 to have a transmission authority.

In operation S985, the server 100 may transmit to the first terminal 125 a transmission authority reject message indicating that a transmission authority is not allowed.

As another example, the server 100 may transmit a transmission authority reject message to all of the plurality of terminals included in the same group. The server 100 may transmit to the first terminal 121, the second terminal 123, and the third terminal 125 a transmission authority reject message indicating that a transmission authority is not allowed.

As another example, the server 100 may transmit a transmission authority reject message to all of the terminals not allowed to have transmission authorities from among the plurality of terminals included in the same group.

In operation S990, when the first terminal 121 has completed data transmission, the first terminal 121 may return its transmission authority to the server 110. For example, the first terminal 121 may transmit to the server 110 a signal representing that a transmission authority has been returned, to thereby return its transmission authority.

In operation S995, the server may transmit a transmission authority allow message to the third terminal 125. As the transmission authority of the first terminal 121 is returned, the server 110 may re-determine a transmission authority for the third terminal. For example, the server 110 may allow the first terminal 121 to have a transmission authority. As the server 110 allows the first terminal 121 to have a transmission authority, the server 110 may transmit a transmission authority allow message to the third terminal.

Figure 10:
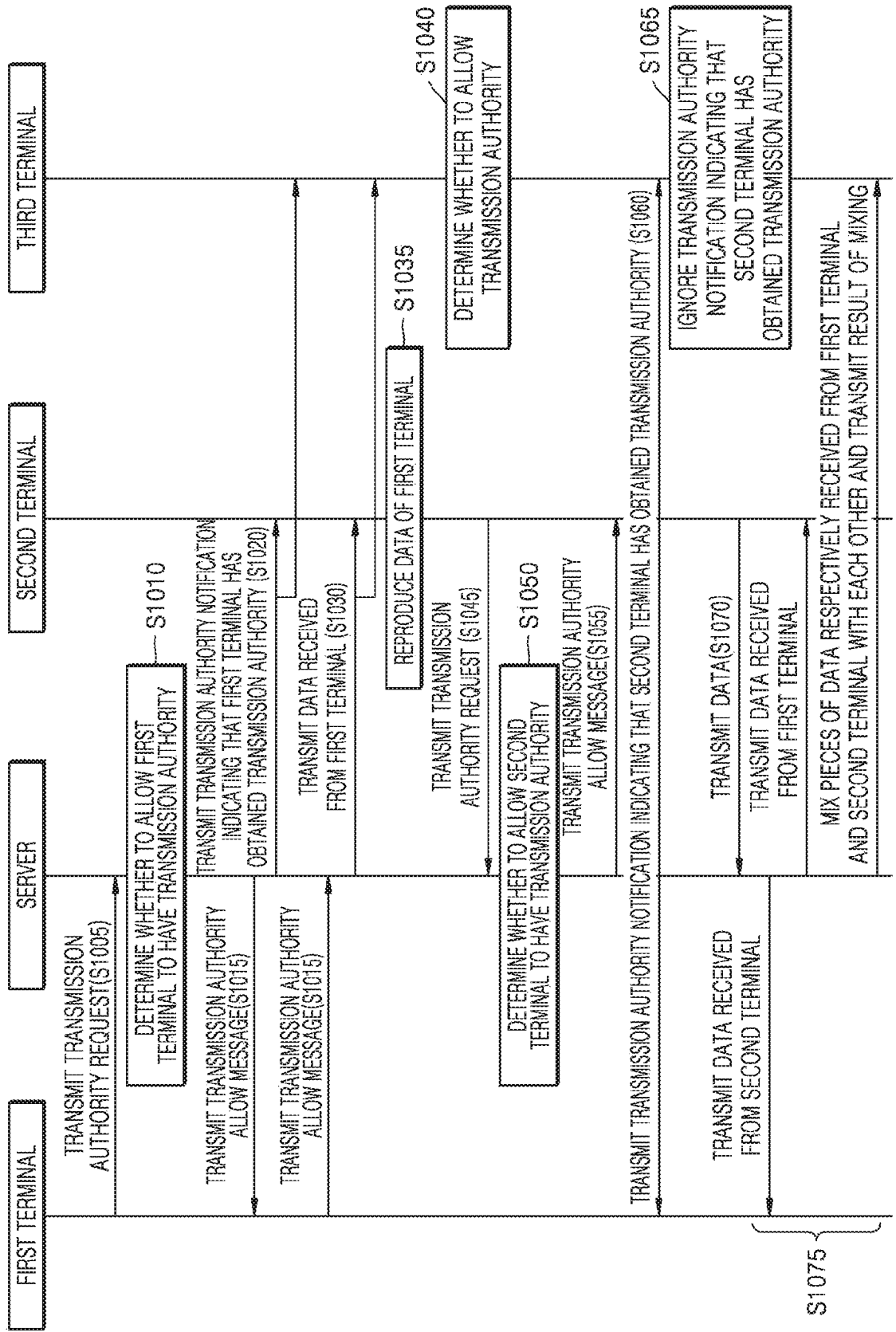
FIG. 10 is a flowchart of a method of performing communication between a server and a plurality of terminals when the plurality of terminals include a terminal unable to simultaneously receive respective pieces of data of the other terminals, according to another embodiment of the present invention.

FIG. 10 is a flowchart of a method of performing communication between a server and a plurality of terminals when the plurality of terminals include a terminal unable to simultaneously receive respective pieces of data of other terminals, according to another embodiment of the present invention.

In operation S1005, a first terminal may transmit a transmission authority request to the server.

In operation S1010, the server may determine whether to allow the first terminal to have a transmission authority.

The server according to an embodiment of the present invention may determine whether the number of transmitting terminals allowed transmission authority is equal to the maximum number of transmitting terminals. Because the number of transmitting terminals allowed transmission authority is smaller than the maximum number of transmitting terminals, the server may allow the first terminal to have a transmission authority.

In operation S1015, as the server allows the first terminal to have a transmission authority, the server may transmit a transmission authority allow message to the first terminal.

In operation S1020, the server may transmit to a second terminal and a third terminal a transmission authority notification indicating that the first terminal has obtained a transmission authority.

In operation S1025, the first terminal may transmit data to the sever.

In operation S1030, the server may transmit the data received from the first terminal to each of the second terminal and the third terminal.

In operation S1035, the second terminal may reproduce the received data of the first terminal.

In operation S1040, the third terminal may reproduce the received data of the first terminal.

Operations S1035 and S1040 have been described sequentially for just convenience of explanation. Operations S1035 and S1040 may be performed at the same time, or operation S1040 may be performed prior to operation S1035.

In operation S1045, the second terminal may transmit a transmission authority request to the server.

In operation S1050, the server may determine whether to allow the second terminal to have a transmission authority.

The server according to an embodiment of the present invention may determine whether the number of transmitting terminals allowed transmission authority is equal to the maximum number of transmitting terminals. Because the number of transmitting terminals allowed transmission authority is smaller than the maximum number of transmitting terminals, the server may allow the second terminal to have a transmission authority.

In operation S1055, as the server allows the second terminal to have a transmission authority, the server may transmit a transmission authority allow message to the second terminal. When the number of pre-determined transmitting terminals is less than the maximum number of transmitting terminals, the server according to an embodiment of the present invention may allow the second terminal to have a transmission authority.

As the server allows the second terminal to have a transmission authority, both the first terminal and the second terminal may obtain transmission authorities.

In operation S1060, the server may transmit to the first terminal and the third terminal a transmission authority notification indicating that the second terminal has obtained a transmission authority.

A transmission authority notification transmitted by the server according to an embodiment of the present invention may include ID information representing that a plurality of terminals have obtained transmission authorities. For example, the server may display ID information representing that the first terminal and the second terminal have obtained transmission authorities, on one of at least one flag included in packets that constitute a transmission authority notification. For example, the transmission authority notification may include respective ID values of the first terminal and the second terminal each allowed to have a transmission authority.

In operation S1065, the third terminal may ignore the transmission authority notification indicating that the second terminal has obtained a transmission authority. Herein, it is assumed that the third terminal is unable to simultaneously receive respective pieces of data of at least two terminals having obtained transmission authorities. Accordingly, the third terminal may not decode ID information included in transmission authority notification and representing that the plurality of terminals have obtained transmission authorities. The third terminal according to an embodiment of the present invention may ignore a transmission authority notification including information about a plurality of terminals each allowed to have a transmission authority.

In operation S1070, the second terminal may transmit data to the server.

In operation S1075, the server may transmit the received data to each of the plurality of terminals. The server may receive data from each of the first terminal and the second terminal having obtained transmission authorities. The server may transmit the data received from the second terminal to the first terminal. The server may transmit the data received from the first terminal to the second terminal.

The server according to an embodiment of the present invention may mix the pieces of data respectively received from the first terminal and the second terminal with each other and transmit a result of the mixing to the third terminal unable to simultaneously receive respective pieces of data of a plurality of terminals. Because the third terminal is unable to simultaneously receive respective pieces of data of at least two terminals each having obtained a transmission authority, the third terminal may perform communication by receiving from the server mixed data obtained by mixing the data of the first terminal with the data of the second terminal.

Figure 11:
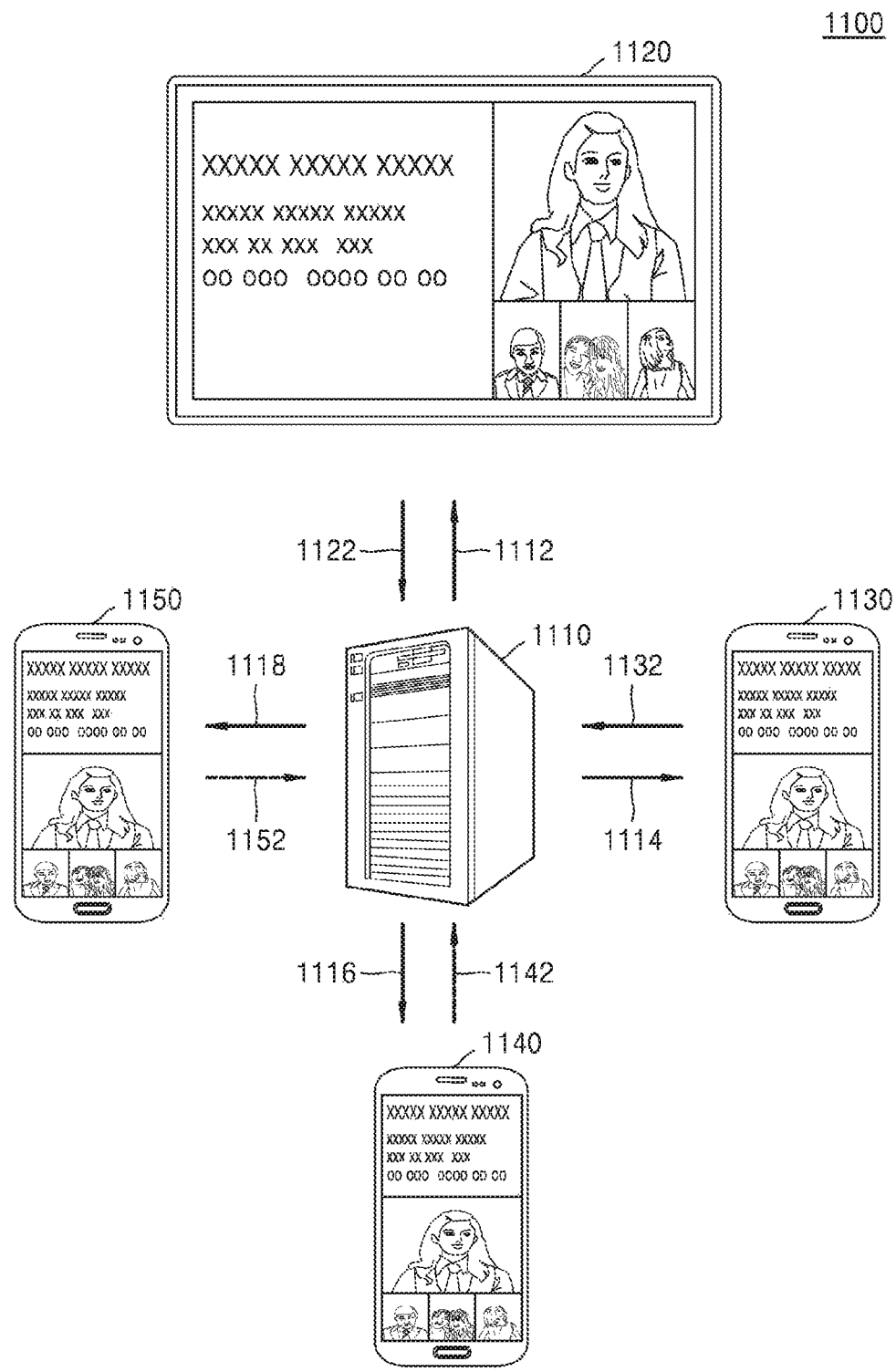
FIG. 11 is a conceptual diagram for describing a system for transmitting and receiving data, according to another embodiment of the present invention.

FIG. 11 is a conceptual diagram for describing a system 1100 for transmitting and receiving data, according to another embodiment of the present invention.

The system 1100 for transmitting and receiving data may include a server 1110 and a plurality of terminals 1120, 1130, 1140, and 1150.

Only components related with the present embodiment from among the components of the system 1100 for transmitting and receiving data are shown in FIG. 11. It will be understood by one of ordinary skill in the art related with the present embodiment that general-use components other than the components illustrated in FIG. 11 may be further included. For example, the system 1100 of FIG. 11 for transmitting and receiving data may further include at least one terminal in addition to the first terminal 1120, the second terminal 1130, the third terminal 1140, and the fourth terminal 1150.

The server 1110 is a computing device having the ability to calculate data and capable of performing wired communication or wireless communication. The server 1110 may communicate with the plurality of terminals 1120, 1130, 1140, and 1150.

The server 1110 may designate the plurality of terminals 1120, 1130, 1140, and 1150 as one group, based on the call setting signals respectively received from the plurality of terminals 1120, 1130, 1140, and 1150. The call setting signals may include information about the plurality of terminals 1120, 1130, 1140, and 1150 included in the same group, and information representing group communication.

According to another example, the server 1110 may receive a call setting signal for requesting group communication from one (e.g., 1120) of the plurality of terminals 1120, 1130, 1140, and 1150. The server 1110 may identify information included in the received call setting signal and representing group communication and information about the other terminals (e.g., 1130, 1140, and 1150) included in the same group. The server 1110 may transmit the call setting signal for group communication to the other terminals (e.g., 1130, 1140, and 1150) identified from the call setting signal.

The server 1110 according to an embodiment may receive data from at least some (e.g., 1120) of the plurality of terminals 1120, 1130, 1140, and 1150. The server 1110 may transmit the received data to the other terminals (e.g., 1130, 1140, and 1150).

A maximum transmitting terminal number representing the number of transmission-allowed terminals may be previously set in the server 1110. The maximum number of transmitting terminals may be classified into two types. For example, the maximum number of transmitting terminals represents the first type maximum number representing the maximum number of transmitting terminals that may each be allowed first type transmission authority, and the second type maximum number representing the maximum number of transmitting terminals that may each be allowed second type transmission authority.

According to an embodiment of the present invention, a transmitting terminal having obtained a first type transmission authority may continuously maintain the first type transmission authority even after completing data transmission. Accordingly, the transmitting terminal having obtained the first type transmission authority may transmit data to a server even when the server is not additionally requested for a transmission authority after the transmitting terminal having obtained the first type transmission authority transmits data. However, the transmitting terminal having obtained the first type transmission authority may return the first type transmission authority to the server 110 by transmitting to the server a message representing that the first type transmission authority is returned.

According to an embodiment of the present invention, a transmitting terminal having obtained a second type transmission authority needs to return the second type transmission authority to the server after completing data transmission. Accordingly, in order to subsequently transmit another piece of data to the server, the transmitting terminal having obtained the second type transmission authority needs to additionally request the server for a second type transmission authority. As another example, when data is not received from the second terminal 1130 having obtained a second type transmission authority during a preset time period or more, the server 1110 may remove the second type transmission authority from the second terminal 1130.

According to an embodiment of the present invention, the server 1110 may determine a type for a received transmission authority request by using a flag representing the type of transmission authority from among the flags of packets that constitute the received transmission authority request.

Referring to FIG. 11, the first terminal 1120 may transmit a first type transmission authority request 1122 to the server 1110. As the server 1110 receives the first type transmission authority request 1122 from the first terminal 1120, the server 1110 may determine whether to allow the first terminal 1120 to have a first type transmission authority. The server 1110 according to an embodiment of the present invention may determine whether to allow the first terminal 1120 to have a first type transmission authority, by comparing the maximum number of first type transmitting terminals with the number of terminals allowed first type transmission authority. When the number of terminals allowed first type transmission authority is less than the maximum number of first type transmitting terminals, the server 1110 may transmit to the first terminal 1120 a message 1112 representing that the first type transmission authority is allowed.

The second terminal 1130 may transmit a first type transmission authority request 1132 to the server 1110. As the server 1110 receives the first type transmission authority request from the second terminal 1130, the server 1110 may determine whether to allow the second terminal 1130 to have a first type transmission authority. When the number of terminals allowed first type transmission authority is less than the maximum number of first type transmitting terminals, the server 1110 may transmit to the second terminal 1130 a message 1114 representing that the first type transmission authority is allowed.

When the number of terminals allowed first type transmission authorities corresponds to the maximum number of first type transmitting terminals, the server 1110 may not allow the second terminal 1130 to have a first type transmission authority. The server 1110 may transmit to the second terminal 1130 a transmission authority reject message indicating that a first type transmission authority is not allowed. As another example, the server 1110 may transmit the transmission authority reject message to all of the plurality of terminals 1120, 1130, 1140, and 1150 included in the same group.

The third terminal 1140 may transmit a second type transmission authority request 1142 to the server 1110. As the server 1110 receives the second type transmission authority request 1142 from the third terminal 1140, the server 1110 may determine whether to allow the third terminal 1140 to have a second type transmission authority. The server 1110 according to an embodiment of the present invention may determine whether to allow the third terminal 1140 to have a second type transmission authority, by comparing the maximum number of second type transmitting terminals with the number of terminals allowed second type transmission authority. When the number of terminals allowed second type transmission authority is less than the maximum number of second type transmitting terminals, the server 1110 may transmit to the third terminal 1140 a message 1116 representing that the second type transmission authority is allowed.

The fourth terminal 1150 may transmit a second type transmission authority request 1142 to the server 1110. As the server 1110 receives the second type transmission authority request 1152 from the fourth terminal 1150, the server 1110 may determine whether to allow the fourth terminal 1150 to have a second type transmission authority. The server 1110 according to an embodiment of the present invention may determine whether to allow the fourth terminal 1150 to have a second type transmission authority, by comparing the maximum number of second type transmitting terminals with the number of terminals allowed second type transmission authority. When the number of terminals allowed second type transmission authorities is less than the maximum number of second type transmitting terminals, the server 1110 may transmit to the fourth terminal 1150 a message 1118 representing that the second type transmission authority is allowed.

According to another embodiment, the server 1110 may determine a type for the transmission authority of each of the plurality of terminals 1120, 1130, 1140, and 1150, based on the traffic of the plurality of terminals 1120, 1130, 1140, and 1150. For example, the server 1110 may determine traffic between the plurality of terminals 1120, 1130, 1140, and 1150, based on data transmitted and received between the plurality of terminals 1120, 1130, 1140, and 1150, for a preset time period.

The server 1110 may determine whether to allow a transmission authority, based on the traffic of a terminal having requested a transmission authority from among the plurality of terminals 1120, 1130, 1140, and 1150. The server 1110 according to an embodiment of the present invention may give (ok?) first type transmission authority to a terminal having traffic equal to or greater than a threshold value from among terminals each having requested a transmission authority. The traffic may be determined according to the number of times data is transmitted for a preset time period. However, this is merely an embodiment of the present invention, and the present invention is not limited thereto. The server 1110 may give second type transmission authority to a terminal having traffic less than the threshold value from among the terminals each having requested a transmission authority.

Figure 12:
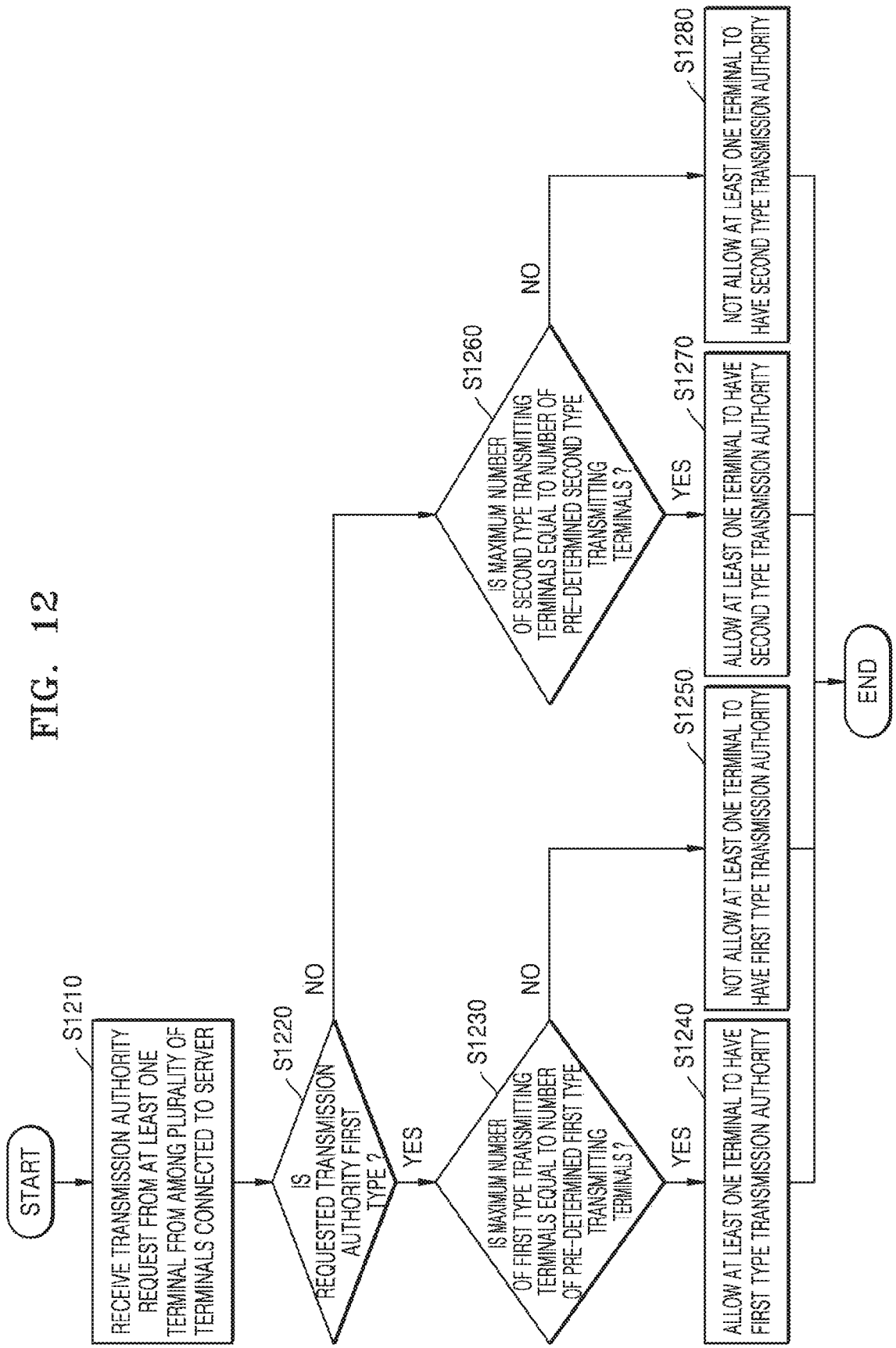
FIG. 12 is a flowchart of a method, performed by a server in a system for transmitting and receiving data, of determining a transmission authority for each of a plurality of terminals, according to another embodiment of the present invention.

FIG. 12 is a flowchart of a method, performed by the server 1100 of the system 1100 according to another embodiment of the present invention for transmitting and receiving data, of determining respective transmission authorities for the plurality of terminals 1120, 1130, 1140, and 1150.

In operation S1210, the server 1110 may receive a transmission authority request from at least one terminal from among the plurality of terminals 1120, 1130, 1140, and 1150 connected to the server 1110.

In operation S1220, the server 1110 may determine whether a requested transmission authority is the first type.

The server 1110 according to an embodiment of the present invention may determine whether the requested transmission authority is the first type, by using transmission authority type information included in the received transmission authority request. For example, when a flag representing the transmission authority type information from among the packets included in the received transmission authority request has a value of 0, the server 1110 may determine the type of the requested transmission authority to be the first type. As another example, when the flag representing the transmission authority type information from among the packets included in the received transmission authority request has a value of 1, the server 1110 may determine the type of the requested transmission authority to be the second type.

In operation S1230, the server 1110 may determine whether the maximum number of first type transmitting terminals is equal to the number of pre-determined first type transmitting terminals. The server 1110 according to an embodiment of the present invention may determine whether to allow the at least one terminal to have a first type transmission authority, by determining whether the maximum number of first type transmitting terminals is equal to the number of pre-determined first type transmitting terminals.

In operation S1240, the server 1110 may not allow the at least one terminal to have a first type transmission authority.

When the maximum number of first type transmitting terminals is equal to the number of pre-determined first type transmitting terminals, the server 1110 according to an embodiment of the present invention may not allow the at least one terminal to have a first type transmission authority.

In operation S1250, the server 1110 may allow the at least one terminal to have a first type transmission authority.

When the number of pre-determined first type transmitting terminals is less than the maximum number of first type transmitting terminals, the server 1110 according to an embodiment of the present invention may allow the at least one terminal to have a first type transmission authority. However, when a plurality of terminals have requested a first type transmission authority and a sum of the number of terminals having requested a first type transmission authority and the number of pre-determined first type transmitting terminals is less than or equal to the preset maximum number of first type transmitting terminals, the server 1110 may allow each of the plurality of terminals to have a first type transmission authority.

When the sum of the number of terminals having requested a first type transmission authority and the number of pre-determined first type transmitting terminals exceeds the preset maximum number of first type transmitting terminals, the server 1110 according to an embodiment of the present invention may select some terminals from among the plurality of terminals and allow the selected terminals to each have a first type transmission authority. For example, the server 1110 may select some terminals from among the plurality of terminals, based on preset priority information.

As another example, when a sum of the number of terminals having transmitted a first type transmission authority request and the number of pre-determined second type transmitting terminals exceeds the preset maximum number of second type transmitting terminals, the server 1110 may not allow each of the terminals having transmitted a first type transmission authority request to have a first type transmission authority.

In operation S1260, the server 1110 may determine whether the maximum number of second type transmitting terminals is equal to the number of pre-determined second type transmitting terminals. The server 1110 according to an embodiment of the present invention may compare the number of pre-determined transmitting terminals allowed second type transmission authorities with the maximum number of second type transmitting terminals.

In operation S1270, the server 1110 may not allow the at least one terminal to have a second type transmission authority.

When the maximum number of second type transmitting terminals is equal to the number of pre-determined second type transmitting terminals, the server 1110 according to an embodiment of the present invention may not allow the at least one terminal to have a second type transmission authority.

In operation S1280, the server 1110 may allow the at least one terminal to have a second type transmission authority.

When the number of pre-determined second type transmitting terminals is less than the maximum number of second type transmitting terminals, the server 1110 according to an embodiment of the present invention may allow the at least one terminal to have a second type transmission authority. However, when a plurality of terminals have requested a second type transmission authority and a sum of the number of terminals having requested a second type transmission authority and the number of pre-determined second type transmitting terminals is less than or equal to the preset maximum number of second type transmitting terminals, the server 1110 may allow each of the plurality of terminals to have a second type transmission authority.

When the sum of the number of terminals having requested a second type transmission authority and the number of pre-determined second type transmitting terminals exceeds the preset maximum number of second type transmitting terminals, the server 1110 according to an embodiment of the present invention may select some terminals from among the plurality of terminals and allow the selected terminals to each have a second type transmission authority. For example, the server 1110 may select some terminals from among the plurality of terminals, based on preset priority information.

As another example, when a sum of the number of terminals having transmitted a second type transmission authority request and the number of pre-determined second type transmitting terminals exceeds the preset maximum number of second type transmitting terminals, the server 1110 may not allow each of the terminals having transmitted a second type transmission authority request to have a second type transmission authority.

Figure 13:
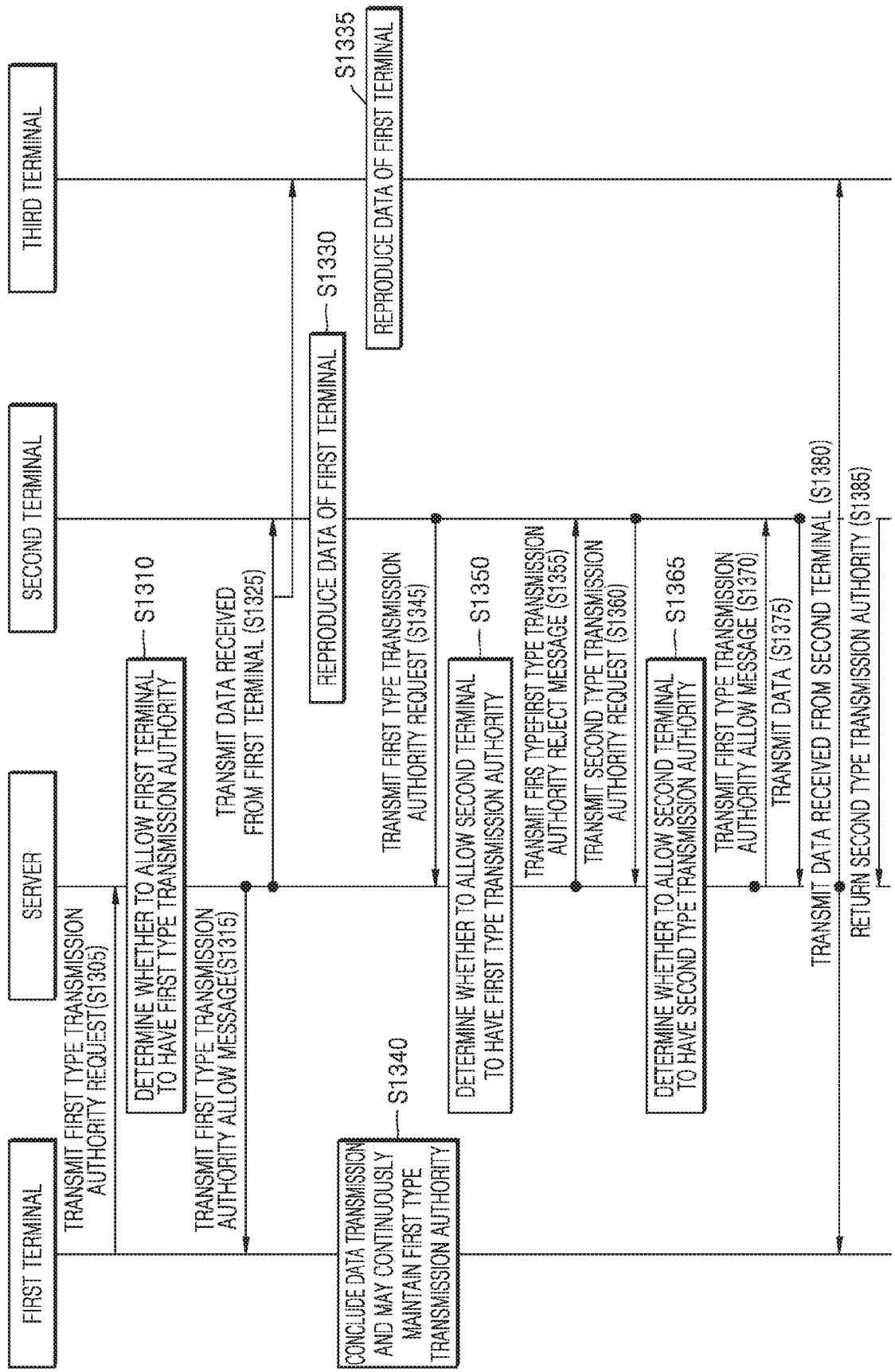
FIG. 13 is a flowchart of a method of transmitting and receiving data between a server and terminals having obtained different transmission authorities, according to an embodiment of the present invention.

FIG. 13 is a flowchart of a method of transmitting and receiving data between a server and terminals having obtained different transmission authorities, according to an embodiment of the present invention.

In operation S1305, the first terminal 1120 may transmit a transmission authority request to the server 1110.

In operation S1310, as the server 1110 receives the first type transmission authority request from the first terminal 1120, the server 1110 may determine whether to allow the first terminal 1120 to have a first type transmission authority.

In operation S1315, as the server 1110 allows the first terminal 1120 to have a first type transmission authority, the server 110 may transmit a transmission authority allow message to the first terminal 1120.

In operation S1320, as the first terminal 1120 receives the transmission authority allow message from the server 1110, the first terminal 1120 may transmit data to the server 1110. The data may be transmitted to the server 1110 via streaming.

In operation S1325, the server 1110 may transmit the data received from the first terminal 1120 to each of the second terminal 1130 and the third terminal 1140.

In operation S1330, the second terminal 1130 may reproduce the data of the first terminal 1120 received from the server 1110.

In operation S1335, the second terminal 1140 may reproduce the data of the first terminal 1120 received from the server 1110.

Operations S1330 and S1335 have been described sequentially for just convenience of explanation. Operations S1330 and S1335 may be performed at the same time, or operation S1335 may be performed prior to operation S1330.

In operation S1340, even after the first terminal 1120 has completed data transmission, the first terminal 1120 may continuously maintain the first type transmission authority.

In operation S1345, the second terminal 1130 may transmit a first type transmission authority request to the server 1100.

In operation S1350, as the server 1100 receives the first type transmission authority request from the second terminal 1130, the server 1100 may determine whether to allow the second terminal 1130 to have a first type transmission authority.

The server 110 may determine whether the number of transmitting terminals allowed first type transmission authority is equal to the maximum number of first type transmitting terminals. Because the number of terminals allowed first type transmission authority is equal to the maximum number of first type transmitting terminals, the server 110 may not allow the second terminal 1130 to have a first type transmission authority.

In operation S1355, the server may transmit a transmission authority reject message to the second terminal 1130.

In operation S1360, the second terminal 1130 may transmit a second type transmission authority request to the server 1100. As the first type transmission authority request is rejected, the second terminal 1130 according to an embodiment of the present invention may transmit the second type transmission authority request to the server 1100.

In operation S1365, as the server 1100 receives the second type transmission authority request from the second terminal 1130, the server 1100 may determine whether to allow the second terminal 1130 to have a second type transmission authority.

In operation S1370, the server may transmit a transmission authority allow message to the second terminal 1130. Because the number of terminals allowed second type transmission authority is less than the maximum number of second type transmitting terminals, the server 1110 may allow the second terminal 1130 to have a transmission authority.

In operation S1375, as the second terminal 1130 receives the transmission authority allow message from the server 1100, the second terminal 1130 may transmit data to the server 1110.

In operation S1380, the server 1110 may transmit the data received from the second terminal 1130 to each of the second terminal 1120 and the third terminal 1140.

In operation S1385, when the second terminal 1130 has completed data transmission, the second terminal 1130 may return the second type transmission authority to the server 1110.

According to an embodiment of the present invention, the second terminal 1130 having obtained a second type transmission authority may return the second type transmission authority to the server 1110 after completing data transmission. As another example, when data is not received from the second terminal 1130 having obtained a second type transmission authority during a preset time period or more, the server 1110 may remove the second type transmission authority from the second terminal 1130.

Figure 14:
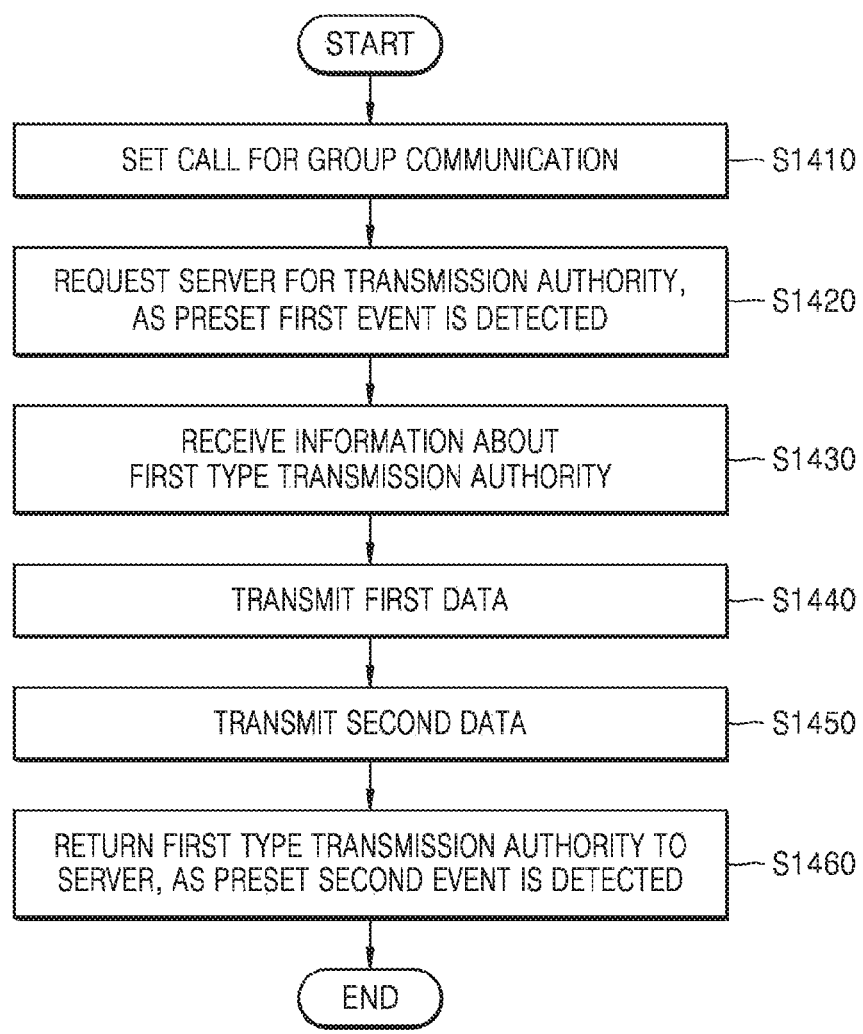
FIG. 14 is a flowchart of a method, performed by a terminal having obtained a first type transmission authority, of transmitting and receiving data as a preset event is detected, according to an embodiment of the present invention.

FIG. 14 is a flowchart of a method, performed by a terminal having obtained a first type transmission authority, of transmitting and receiving data as a preset event is detected, according to an embodiment of the present invention.

In operation S1410, the first terminal 1120 may set a call for group communication. The first terminal 1120 according to an embodiment of the present invention may set the call by transmitting a signal for call setting to the server 1110. The call setting signal may include information about the other terminals desired to perform group communication.

In operation S1420, as the first terminal 1120 detects a preset first event, the first terminal 1120 may request the server 1110 for a transmission authority. Herein, the event may be at least one of an input obtained from a user, a change in the status of the user, and a change in the status of a terminal. The change in the status of the user may represent a change in a motion, operation, location, and bio-signal of the user. The change in the status of a terminal may represent a change in a location and movement velocity of the terminal.

For example, the first terminal 1120 may detect a touch input of a user who touches a call mode switch button included in the first terminal 1120. As another example, the first terminal 1120 may detect an operation of the user corresponding to one of a plurality of preset operations.

According to an embodiment of the present invention, the first terminal 1120 having obtained a first type transmission authority may continuously maintain the first type transmission authority even after completing data transmission. Accordingly, in order to subsequently transmit another piece of data to the server 1110, the first terminal 1120 having obtained the first type transmission authority may transmit data to the server 110 even when the server 1110 is not additionally requested for a first type transmission authority. However, the first terminal 1120 having obtained the first type transmission authority may return the first type transmission authority to the server 1110 by transmitting to the server 1110 a message representing that the first type transmission authority is returned.

In the present embodiment, a case where the first terminal 1120 has obtained a first type transmission authority from the server 1110 is assumed and described.

In operation S1430, the first terminal 1120 may receive information about a first type transmission authority from the server 1110.

As the server 1110 according to an embodiment of the present invention receives the first type transmission authority request 1122 from the first terminal 1120, the server 1110 may determine whether to allow the first terminal 1120 to have a first type transmission authority. The server 1110 according to an embodiment of the present invention may determine whether to allow the first terminal 1120 to have a first type transmission authority, by comparing the maximum number of first type transmitting terminals with the number of terminals allowed first type transmission authority.

When the number of terminals allowed first type transmission authority is less than the maximum number of first type transmitting terminals, the first terminal 1120 may receive a transmission authority allow message representing that the first type transmission authority is allowed. As another example, when the number of terminals allowed first type transmission authority is equal to the maximum number of first type transmitting terminals, the first terminal 1120 may receive a transmission authority reject message representing that the first type transmission authority is not allowed.

FIG. 14 illustrates a case where a first type transmission authority of the first terminal 1120 is allowed by the server 1110.

In operation S1440, according to a transmission authority allowed by the server 1110, the first terminal 1120 may transmit first data.

In operation S1450, the first terminal 1120 may transmit second data obtained after sending the first data to the server 1110.

When the first terminal 11120 transmits the second data, which is another piece of data obtained after data transmission is completed, the first terminal 11120 may transmit the second data to the server 1110 without performing a special operation for obtaining a transmission authority. The data transmitted to the server 1110 may be transmitted by the server 1110 to the other terminals 1130, 1140, and 1150.

In operation S1460, as the first terminal 1120 detects a preset second event, the first terminal 1120 may return the first type transmission authority to the server 1110. As described above with regard to operation S1410, the second event may be at least one of an input obtained from a user, a change in the status of the user, and a change in the status of a terminal. For example, the first terminal 1120 may detect a touch input of a user who touches a call mode switch button included in the first terminal 1120 for at least three seconds. As another example, the first terminal 1120 may detect an operation of the user corresponding to one of a plurality of preset operations.

As the touch input of the user who touches a call mode switch button included in the first terminal 1120 for at least three seconds is detected, the first terminal 1120 according to an embodiment of the present invention may return the first type transmission authority to the server. As the first type transmission authority is returned to the server 1110, the first terminal 1120 may re-request the server 1110 for a transmission authority in order to transmit data.

FIG. 15 is a schematic diagram for explaining a method, performed by a terminal, of obtaining a first type transmission authority and transmitting data according to a change in the movement velocity of a user, according to an embodiment of the present invention.

When it is determined based on location information of the terminal 1510 that a movement velocity of the terminal 1510 exceeds 10 km/h, the terminal 1510 may request a server for a first type transmission authority. On the other hand, when it is determined based on the location information of the terminal 1510 that the movement velocity of the terminal 1510 is less than or equal to 10 km/h, the terminal 1510 may return a first type transmission authority to the server.

In (a) of FIG. 15, a schematic diagram for explaining an operation of the terminal 1510 when the movement velocity exceeds 10 km/h is illustrated. Referring to a dashboard 1520 of a vehicle illustrated in (a) of FIG. 15, it may be seen that the movement velocity is 50 km/h.

The terminal 1510 according to an embodiment of the present invention may detect that the movement velocity exceeds 10 km/h. The movement velocity exceeding 10 km/h may correspond to the first event described above with reference to FIG. 14.

As the movement velocity exceeds 10 km/h, the first terminal 1120 may request the server 1110 for a first type transmission authority. According to an embodiment of the present invention, the first terminal 1120 having obtained a first type transmission authority may continuously maintain the first type transmission authority even after completing data transmission. Accordingly, when a user desires to transmit data, the user may transmit the data without performing an operation for requesting a transmission authority.

The terminal 1510 may receive information about the requested first type transmission authority. For example, the server 110 may transmit to the terminal 1510 a transmission authority allow message representing that the first type transmission authority is allowed or a transmission authority reject message representing that the first type transmission authority is not allowed. In the present embodiment, a case where the terminal 1510 has received the transmission authority allow message from the server 1110 is assumed and described.

In (b) of FIG. 15, a schematic diagram for explaining an operation of the terminal 1510 when the movement velocity is less than or equal to 10 km/h is illustrated.

Referring to the dashboard 1520 of the vehicle illustrated in (b) of FIG. 15, it may be seen that the movement velocity is 8 km/h.

The terminal 1510 according to an embodiment of the present invention may detect that the movement velocity is less than or equal to 10 km/h. The movement velocity being less than or equal to 10 km/h may correspond to the second event described above with reference to FIG. 14. The terminal 1510 according to an embodiment of the present invention may return the first type transmission authority as the movement velocity decreases to 10 km/h or less.

FIG. 16 is a schematic diagram for explaining a method, performed by a terminal 1610, of obtaining a first type transmission authority and transmitting data as a user input is detected, according to an embodiment of the present invention.

As a user input is detected, the terminal 1610 may request the server 1110 for a first type transmission authority. The user input may include a touch input and a hovering input. As another example, the user input may be obtained via an input tool.

In (a) of FIG. 16, a diagram for explaining an operation in which, as a touch input of a user is detected, the terminal 1610 transmits a first type transmission authority request to the server 1110 is illustrated.

When a touch input of a user is detected on a simultaneous call mode button included in the terminal 1610 according to an embodiment of the present invention, the terminal 1610 may transmit a first type transmission authority request to the server 1110. The touch input of the user being detected on the simultaneous call mode button may correspond to the first event described above with reference to FIG. 14.

The terminal 1610 may receive information about a requested first type transmission authority. For example, the server 1110 may transmit a transmission authority allow message or a transmission authority reject message to the terminal 1610. In the present embodiment, a case where the terminal 1610 has received the transmission authority allow message from the server 1110 is assumed and described.

(b) of FIG. 16 is a schematic diagram a method in which the terminal 1610 transmits data to the server 1110 as the terminal 1610 obtains the first type transmission authority.

After obtaining the first type transmission authority, the terminal 1610 may continuously transmit data to the server 1110 without a special additional operation.

When a second event is detected, the terminal 1610 may return the first type transmission authority to the server 1110. For example, when another touch input of the user is detected on the simultaneous call mode button included in the terminal 1610, the terminal 1610 may return the first type transmission authority to the server 1110.

Figure 17:
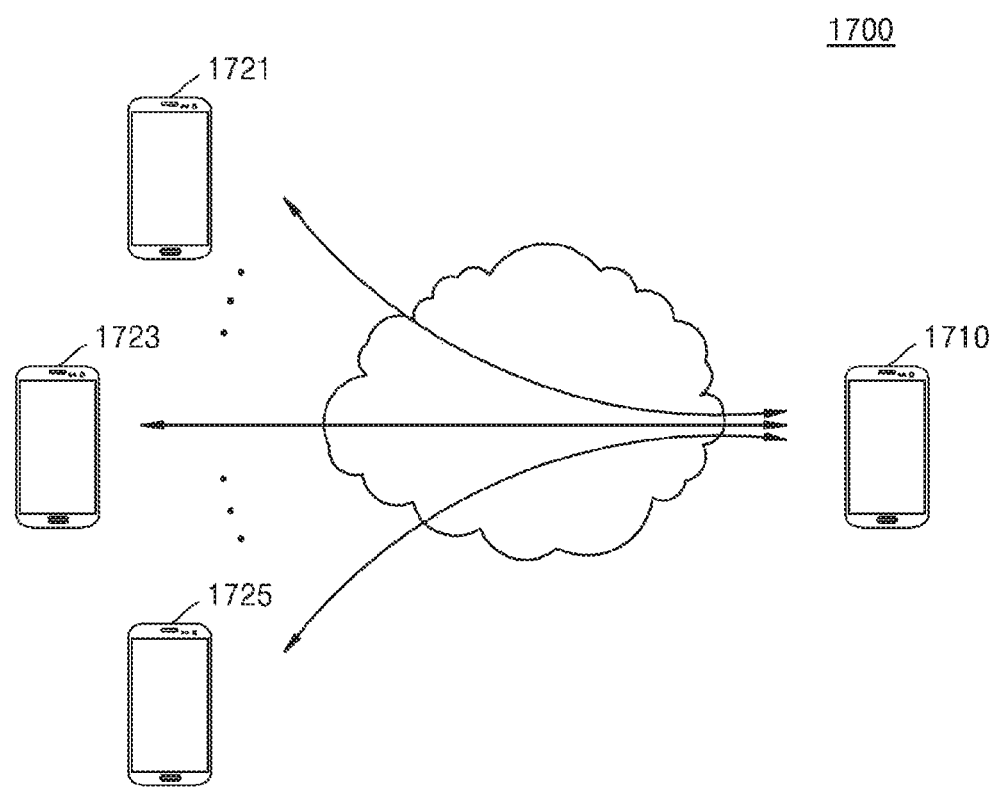
FIG. 17 is a conceptual diagram for describing a system for transmitting and receiving data, according to another embodiment of the present invention.

FIG. 17 is a conceptual diagram for describing a system 1700 for transmitting and receiving data, according to another embodiment of the present invention.

The system 1700 for transmitting and receiving data may include a plurality of terminals 1710, 1721, 1723, and 1725.

Only components related with the present embodiment from among the components of the system 1700 for transmitting and receiving data are shown in FIG. 17. It will be understood by one of ordinary skill in the art related with the present embodiment that general-use components other than the components illustrated in FIG. 17 may be further included. For example, the system 1700 of FIG. 10 for transmitting and receiving data may further include at least one terminal in addition to the plurality of terminals 1710, 1721, 1723, and 1725.

The first terminal 1710 is a computing device having the ability to calculate data and capable of performing wired communication or wireless communication. The first terminal 1710 may communicate with the other terminals 1721, 1723, and 1725.

The first terminal 1710 may receive a call setting signal for communication connection from each of the plurality of terminals 1721, 1723, and 1725. The first terminal 1710 may designate the plurality of terminals 1721, 1723, and 1725 as one group, based on the call setting signals respectively received from the plurality of terminals 1721, 1723, and 1725. The call setting signals may include information about the plurality of terminals 1721, 1723, and 1725 included in the same group, and information designating group communication.

The first terminal 1710 according to an embodiment may transmit data received from some (for example, 1721) of the other terminals 1721, 1723, and 1725 to the other terminals (for example, 1723 and 1725).

Even when there is a terminal (for example, the terminal 1721) that has already been transmitting data to the first terminal 1710, the first terminal 1721 may receive data from another terminal (for example, the terminal 1723). The first terminal 1710 may transmit data received from each of the terminals 1721 and 1723 to the other terminals.

A maximum transmitting terminal number representing the number of terminals that may be allowed to transmit data to the first terminal 1710 may be previously set in the first terminal 1710. For example, when the maximum transmitting terminal number pre-set in the first terminal 1710 is 2, the first terminal 1710 may receive data from at most two terminals. The first terminal 1710 may determine whether to allow transmission of terminals that request the first terminal 1710 for a transmission authority, according to the preset maximum transmitting terminal number.

The second terminal 1721, the third terminal 1723, and the fourth terminal 1725 may obtain transmission authorities from the first terminal 1710 in order to transmit data to another terminal. A terminal (e.g., 1721) having obtained a transmission authority may transmit data to the first terminal 1710. The first terminal 1710 may transmit the data received from the terminal having obtained a transmission authority to the other terminals (for example, 1723 and 1725).

Figure 18:
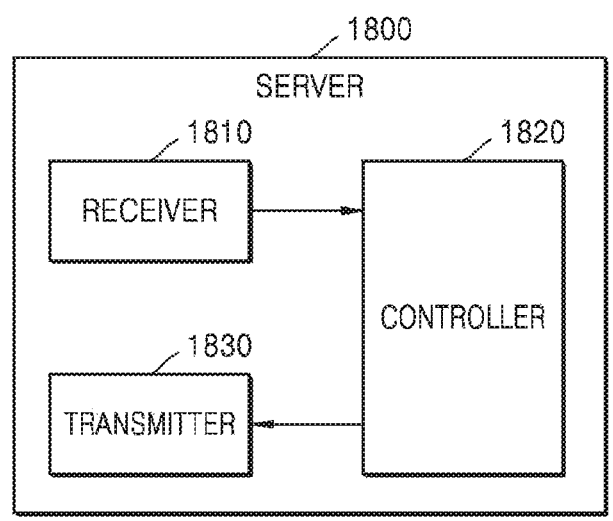
FIG. 18 is a block diagram of a server according to an embodiment of the present invention.

FIG. 18 is a block diagram of a server 1800 according to an embodiment of the present invention.

Referring to FIG. 18, the server 1800 may include a receiver 1810, a controller 1820, and a transmitter 1830.

Only components related with the present embodiment from among the components of the server 1800 are shown in FIG. 18. It will be understood by one of ordinary skill in the art related with the present embodiment that general-use components other than the components illustrated in FIG. 18 may be further included.

The server 1800 of FIG. 18 may correspond to the server 110 described above with reference to FIG. 1.

The receiver 1810 receives a transmission authority request from at least one terminal from among a plurality of terminals connected to the server 1800.

In response to the transmission authority request, the controller 1820 compares the number of transmitting terminals previously determined by the server 1800 with the maximum number of transmitting terminals allowable by the server 1800. The controller 1820 determines a transmission authority of the at least one terminal, based on a result of the comparison. When the at least one terminal has obtained a transmission authority, the controller 1820 may control the receiver 1830 to receive data from the at least one terminal. The maximum number of allowable transmitting terminals may be previously stored in memory (not shown) included in the server 1800.

The controller 1820 according to an embodiment of the present invention may identify the type of transmission authority requested by the at least one terminal. The transmission authority may be either a first type transmission authority or a second type transmission authority. The controller 1820 may determine whether to allow a first type transmission authority for the at least one terminal, based on the maximum number of first type transmitting terminals previously stored in the memory. As another example, the controller 1820 may determine whether to allow a second type transmission authority for the at least one terminal, based on the maximum number of second type transmitting terminals previously stored in the memory.

The transmitter 1830 may transmit information about the determined transmission authority to the at least one terminal. For example, the transmitter 1830 may transmit a transmission authority allow message to a terminal allowed to have a transmission authority. As another example, the transmitter 1830 may transmit a transmission authority reject message to a terminal not allowed to have a transmission authority.

The transmitter 1830 may transmit data received from a terminal having obtained a transmission authority, together with data received from a pre-determined transmitting terminal, to another terminal included in the plurality of terminals. The controller 1820 may mix the data received from the at least one terminal having obtained a transmission authority with the data received from the pre-determined transmitting terminal. The transmitter 1930 may transmit mixed data to another terminal included in the plurality of terminals.

When data transmission by at least one of the transmitting terminals that transmit data to the server 1800 is completed, the transmission authority may be returned. When a transmission authority return message is obtained from a transmitting terminal having completed data transmission via the receiver 1810, the controller 1820 may remove the transmission-completed transmitting terminal from a list of transmitting terminals. When the transmission authority is returned from the data transmission-completed transmitting terminal, the controller 1820 may re-determine a transmission authority for a terminal not allowed data transmission, according to a determination of the server 1800. For example, the controller 1820 may allow the terminal not allowed data transmission to have a transmission authority.

When a sum of the number of pre-determined transmitting terminals and the number of at least one terminal having requested a transmission authority exceeds the maximum number of transmitting terminals, the controller 1820 according to an embodiment of the present invention may select some terminals, based on the amount of each of at least one terminal used. The controller 1820 may allow the selected terminals to transmit data.

Figure 19:
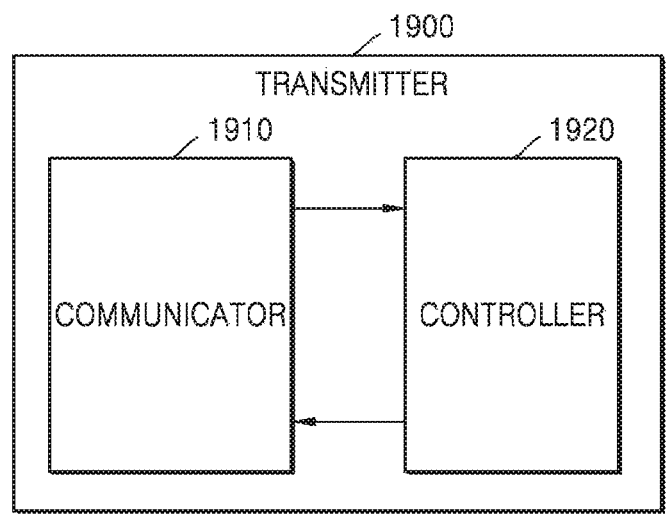

FIGS. 19 and 20 are block diagrams of a terminal 1900 according to an embodiment of the present invention.

Referring to FIG. 19, the terminal 1900 according to an embodiment of the present invention may include a communicator 1910 and a controller 1920. However, all of the illustrated components are not essential. The terminal 1900 may be implemented by more or less components than those illustrated in FIGS. 19 and 20.

For example, as illustrated in FIG. 20, the terminal 1900 according to an embodiment of the present invention may include an output interface 1930, an audio/video (A/V) processor 1940, a user input interface 1950, a sensing unit 1960, and a memory 1980 in addition to the communicator 1910 and the controller 1920.

The aforementioned components will now be described in detail.

The communicator 1910 transmits a transmission authority request to the server 1800. The communicator 1910 may receive from the controller 1920 a signal indicating that data to be transmitted to another terminal has been obtained. In response to the signal indicating that data to be transmitted to another terminal has been obtained, the communicator 1910 may transmit the transmission authority request to the server 1800.

The communicator 1910 receives information about a transmission authority of the first terminal 121 determined based on the number of transmitting terminals pre-determined in the server 1800 and the maximum number of transmitting terminals allowable by the server 1800.

The communicator 1910 according to an embodiment may receive data from each of at least one transmitting terminal having obtained a transmission authority from the server 1800 from among a plurality of terminals.

The communicator 1910 may include at least one component that enables the terminal 1900 to perform communication with the server 1900 or another terminal. For example, the communicator 1910 may include a short-range wireless communication unit 1911, a mobile communication unit 1912, and a broadcasting reception unit 1913.

The short-range wireless communication unit 1911 may include, but is not limited to, a Bluetooth communicator, a Bluetooth low energy (BLE) communicator, a near field communication (NFC) unit, a wireless local area network (WLAN) (e.g., Wi-Fi) communicator, a ZigBee communicator, an infrared Data Association (IrDA) communicator, a Wi-Fi Direct (WFD) communicator, an ultra wideband (UWB) communicator, an Ant+ communicator, and the like.

The mobile communication unit 1912 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting reception unit 1913 receives a broadcasting signal and/or broadcasting-related information from an external source via a broadcasting channel. The broadcasting channel may be a satellite channel, a ground wave channel, or the like. According to embodiments, the terminal 1900 may not include the broadcasting reception unit 1913.

The controller 1920 typically controls all operations of the terminal 1900. For example, the controller 1920 may control the communicator 1910, the output interface 1930, the A/V processor 1940, the user input unit 1950, the sensing unit 1960, and the memory 1980 by executing programs stored in the memory 1980.

The controller 1920 processes data that is to be transmitted to the server 1800, according to the received information about the transmission authority. For example, when a transmission authority is allowed, the controller 1920 may input data to the communicator 1910 such that the data is transmitted to the server 1800. The communicator 1910 transmits the data to the server 1800. As another example, when a transmission authority is not allowed, the controller 1920 may store data in the memory 1980 or delete the data.

However, even when a transmission authority is not obtained from the server 1800, the communicator 1910 may obtain a transmission authority as a transmission authority is returned from a transmitting terminal having completed data transmission to the server 1800 after a certain time period.

The output interface 1930 is used to perform an operation determined by the controller 1920, and may include a display 1931, an audio output interface 1932, and a vibration motor 1933.

The display 1931 outputs information that is processed by the terminal 1900. For example, the display 1931 may display at least a portion of a received image. The display 1931 may display a received screen image on one side of the display 1931.

When the display 1931 forms a layer structure together with a touch pad to construct a touch screen, the display 1931 may be used as an input device as well as an output device. The display 1931 may include at least one of a liquid crystal display (LCD), a thin film transistor-liquid crystal display (TFT-LCD), an organic light-emitting diode (OLED), a flexible display, a 3D display, and an electrophoretic display. According to embodiments of the terminal 1900, the terminal 1900 may include at least two displays 1931. The at least two displays 1931 may be disposed to face each other by using a hinge.

The audio output interface 1932 outputs audio data that is received from the communicator 1910 or stored in the memory 1980. The audio output interface 1932 may also output an audio signal (for example, a call signal receiving sound, a message receiving sound, a notification sound) related with a function of the terminal 1900. The audio output interface 1932 may include, for example, a speaker and a buzzer.

The vibration motor 1933 may output a vibration signal. For example, the vibration motor 1933 may output a vibration signal corresponding to an output of audio data or video data (for example, a call signal receiving sound or a message receiving sound). The vibration motor 273 may also output a vibration signal when a touch screen is touched.

The A/V processor 1940 is to input an audio signal or a video signal, and may include the camera 1941 and a microphone 1942. The camera 1941 may acquire an image frame, such as a still image or a moving picture, via an image sensor in a video call mode or a photography mode. An image captured via the image sensor may be processed by the controller 1920 or a separate image processor (not shown).

The image frame obtained by the camera 1941 may be stored in the memory 1980 or transmitted to the outside via the communicator 1910. At least two cameras 1941 may be included according to embodiments of the structure of a terminal.

The microphone 1942 receives an external audio signal and converts the external audio signal into electrical audio data. For example, the microphone 1942 may receive an audio signal from an external terminal or a speaking person. The microphone 1942 may use various noise removal algorithms in order to remove noise that is generated while receiving the external audio signal. The microphone 1942 according to an embodiment may mix the data received by the receiver 1220 from each of the at least one transmitting terminal.

The user input interface 1950 denotes means via which a user inputs data for controlling the terminal 1900. For example, the user input interface 1950 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The sensing unit 1960 may detect whether a user uses the terminal 200. For example, when at least one of a preset plurality of user inputs is received, the sensing unit 1960 may detect that the user is using the terminal 1900.

The sensing unit 1960 may include, but is not limited thereto, at least one selected from a magnetic sensor 1961, an acceleration sensor 1962, a temperature/humidity sensor 1963, an infrared sensor 1964, a gyroscope sensor 1965, a position sensor (e.g., a GPS) 1966, a pressure sensor 1967, a proximity sensor 1968, an RGB sensor 1969 (i.e., an illuminance sensor), and a motion sensor 1970. Functions of most of the sensors would be instinctively understood by one of ordinary skill in the art in view of their names and thus detailed descriptions thereof will be omitted herein.

The memory 1980 may store a program for processing and control by the controller 1920, or may store input/output data.

The memory 1980 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The terminal 1980 may operate a web storage or a cloud server on the internet which performs a storage function of the memory 1980.

The programs stored in the memory 1980 may be classified into a plurality of modules according to their functions, for example, a UI module 1981, a touch screen module 1982, and a notification module 293.

The UI module 1981 may provide a UI, graphical user interface (GUI), or the like that is specialized for each application and interoperates with the terminal 1900. The touch screen module 1982 may detect a touch gesture on a touch screen of a user and transmit information regarding the touch gesture to the controller 1920. The touch screen module 1982 according to an embodiment of the present invention may recognize and analyze a touch code. The touch screen module 1982 may be configured by separate hardware including a controller.

In order to detect the actual touch or the proximate touch on the touch pad, the touch screen may internally or externally have various sensors. An example of a sensor used to detect a real touch or a proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, and the temperature of a touched point.

Another example of a sensor used to detect the real touch or the proximity touch on the touch screen is a proximity sensor.

The proximity sensor senses the existence of an object that approaches the predetermined sensing surface or an object that exists nearby, without mechanical contact, by using an electromagnetic force or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. Examples of the touch gesture of the user may include tap, touch and hold, double tap, drag, panning, flick, drag and drop, swipe, and the like.

The notification module 1983 may generate a signal for notifying that an event has been generated in the terminal 1900. Examples of the event generated in the terminal 1900 may include call signal receiving, message receiving, a key signal input, schedule notification, and obtainment of a user input. The notification module 1983 may output a notification signal in the form of a video signal via a display 1981, in the form of an audio signal via an audio output interface 1932, or in the form of a vibration signal via a vibration motor 1933.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

To promote understanding of one or more exemplary embodiments, reference has been made to the exemplary embodiments illustrated in the drawings, and specific language has been used to describe these embodiments. However, no limitation of the scope of the inventive concept is intended by this specific language, and exemplary embodiments should be construed to encompass all exemplary embodiments that would normally occur to one of ordinary skill in the art.

The aforementioned embodiments may be described in terms of functional block components and various processing operations. Such functional blocks may be realized by any number of hardware and/or software components configured to perform the specified functions. For example, the aforementioned embodiments may employ various integrated circuit (IC) components, e.g., memory elements, processing elements, logic elements, look-up tables, and the like, which may carry out a variety of functions under the control of one or more microprocessors or other control devices. Similarly, where the elements of the aforementioned embodiments are implemented using software programming or software elements, the disclosed embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of techniques according to the related art for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative embodiments and are not intended to otherwise limit the scope of the embodiments in any way. For the sake of brevity, electronics, control systems, software development and other functional aspects of the systems according to the related art may not be described in detail. Furthermore, the connecting lines, or connectors shown in the various figures presented are intended to represent various functional relationships and/or physical or logical couplings between the various elements. It should be noted that many alternative or additional functional relationships, physical connections or logical connections may be present in a practical apparatus. Moreover, no item or component is essential to the practice of the embodiments described herein unless the element is specifically described as "essential" or "critical".

The invention claimed is:

1. A method, performed by a server, of transmitting and receiving data based on a push to talk (PTT) service, the method comprising:
   receiving a transmission authority request from at least one terminal among a plurality of terminals connected to the server;
   identifying a group in which the at least one terminal is included based on the transmission authority request;
   determining whether to add the at least one terminal as a previously authorized transmitting terminal for the identified group;
   receiving first data from the previously authorized transmitting terminal and second data from a newly authorized transmitting terminal in the group based on a result of the determination; and
   transmitting the first data and the second data to a plurality of terminals in the group,
   wherein the first data is transmitted to an unauthorized terminal and the newly authorized transmitting terminal, and
   wherein the second data is transmitted to the unauthorized terminal and the previously authorized transmitting terminal.

2. The method of claim 1, wherein, when data transmission by at least one transmitting terminal among transmitting terminals that transmit data to the server is completed, the transmission authority is returned to the server.

3. The method of claim 1, wherein the determining comprises:
when a maximum number of transmitting terminals is less than a number of the at least one terminal, selecting some terminals based on the amount of data used at each of the at least one terminal; and
allowing the selected some terminals to have a transmission authority.

4. A non-transitory computer-readable recording medium having recorded thereon a computer program, which, when executed by a computer, performs the method of claim 1.

5. A method, performed by a terminal, of transmitting and receiving data based on a push to talk (PTT) service, the method comprising:
transmitting a transmission authority request, including an identifier of a group in which the terminal is included, to a server by the terminal among a plurality of terminals connected to the server;
receiving information about a transmission authority of the terminal determined based on a determination to add the terminal as a previously authorized transmitting terminal for the identified group;
transmitting data to the server according to the received information about the transmission authority; and
receiving data transmitted from the previously authorized transmitting terminal, from the server,
wherein the data from the terminal and the data transmitted from the previously authorized transmitting terminal to the server is transmitted to an unauthorized terminal in the group and data from the terminal is transmitted to the previously authorized transmitting terminal.

6. The method of claim 5, further comprising:
mixing the data received from each of a plurality of previously authorized transmitting terminals.

7. A server for transmitting and receiving data based on a push to talk (PTT) service, the server comprising:
a transceiver configured to receive a transmission authority request from at least one terminal among a plurality of terminals connected to the server; and
a controller coupled with the transceiver and configured to:
identify a group in which the at least one terminal is included based on the transmission authority request, and
determine whether to add the at least one terminal as a previously authorized transmitting terminal for the identified group,
wherein the transceiver is configured to:
receive first data from the previously authorized transmitting terminal and second data from a newly authorized transmitting terminal in the group based on a result of the determination, and
transmit the first data and the second data to a plurality of terminals in the group,
wherein the first data is transmitted to an unauthorized terminal and the newly authorized transmitting terminal, and
wherein the second data is transmitted to the unauthorized terminal and the previously authorized transmitting terminal.

8. The server of claim 7, wherein, when data transmission by at least one transmitting terminal among transmitting terminals that transmit data to the server is completed, the transmission authority is returned to the server.

9. The server of claim 7, wherein, when a maximum number of transmitting terminals is less than a number of the at least one terminal, the controller selects some terminals based on the amount of data used at each of the at least one terminal and allows the selected some terminals to have a transmission authority.

10. A terminal for transmitting and receiving data based on a push to talk (PTT) service, the terminal comprising:
a transceiver configured to transmit a transmission authority request, including an identifier of a group in which the terminal is included, to a server and receive information about a transmission authority of the terminal determined based on a determination to add the terminal as a previously authorized transmitting terminal for the identified group;
a controller coupled with the transceiver and configured to process data that is to be transmitted to the server, according to the received information about the transmission authority,
wherein the transceiver transmits the data to the server and receives data transmitted from the previously authorized transmitting terminal from the server, and
wherein data from the terminal and the data transmitted from the previously authorized transmitting terminal to the server is transmitted to an unauthorized terminal in the group and data from the terminal is transmitted to the previously authorized transmitting terminal.

11. The terminal of claim 10, wherein
the controller mixes the data received from each of a plurality of previously authorized transmitting terminals.

* * * * *